(12) United States Patent
Hashimoto et al.

(10) Patent No.: US 10,495,941 B2
(45) Date of Patent: Dec. 3, 2019

(54) FOLDABLE ELECTRO-OPTIC DISPLAY INCLUDING DIGITIZATION AND TOUCH SENSING

(71) Applicant: E Ink Corporation, Billerica, MA (US)

(72) Inventors: Keisuke Hashimoto, Tokyo (JP); Kenji Nakazawa, Tokyo (JP)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 15/983,446

(22) Filed: May 18, 2018

(65) Prior Publication Data
US 2018/0335679 A1    Nov. 22, 2018

Related U.S. Application Data

(60) Provisional application No. 62/508,502, filed on May 19, 2017, provisional application No. 62/614,487, filed on Jan. 7, 2018.

(51) Int. Cl.
*G02F 1/167* (2019.01)
*G06F 3/042* (2006.01)
(Continued)

(52) U.S. Cl.
CPC ............. *G02F 1/167* (2013.01); *E05D 3/122* (2013.01); *G02F 1/13338* (2013.01); *G02F 1/133305* (2013.01); *G06F 1/1616* (2013.01); *G06F 1/1641* (2013.01); *G06F 1/1643* (2013.01); *G06F 1/1652* (2013.01);
(Continued)

(58) Field of Classification Search
CPC ................ G02F 1/167; G02F 1/13338; G02F 1/133305; G06F 1/1641; G06F 1/1616; G06F 1/1652; G06F 1/1643; G06F 3/0421; G06F 2203/04102; G06F 3/03545; E05D 3/122; E05Y 2900/606
See application file for complete search history.

(56) References Cited

U.S. PATENT DOCUMENTS 5,760,761 A    6/1998   Sheridon
5,777,782 A    7/1998   Sheridon
(Continued)

FOREIGN PATENT DOCUMENTS

EP    3109847 A1    12/2016
WO    1999067678 A2   12/1999
(Continued)

OTHER PUBLICATIONS

Wood, D., "An Electrochromic Renaissance?" Information Display, 18(3), 24 (Mar. 2002) Mar. 1, 2002.
(Continued)

*Primary Examiner* — Andrew Sasinowski
(74) *Attorney, Agent, or Firm* — Brian D. Bean

(57) ABSTRACT

An electro-optic display that is flexible and may be folded in a book-like fashion. The display apparatus may include a flexible display and a bending mechanism for accommodating the flexible display in a closed state. Portions of the flexible electro-optic display can be coupled to regions of the planar support members so that when the display is in an open state, the display lays flat and smooth. In advanced embodiments, the electro-optic display may include touch sensing or a digitizing layer to record interactions with a stylus.

21 Claims, 26 Drawing Sheets

(51) Int. Cl.
  *G02F 1/1333* (2006.01)
  *E05D 3/12* (2006.01)
  *G06F 1/16* (2006.01)
  *G06F 3/0354* (2013.01)

(52) U.S. Cl.
  CPC .......... *G06F 1/1681* (2013.01); *G06F 3/0421* (2013.01); *E05Y 2900/606* (2013.01); *G06F 3/03545* (2013.01); *G06F 2203/04102* (2013.01)

(56) References Cited

U.S. PATENT DOCUMENTS

| | | |
|---|---|---|
| 5,808,783 A | 9/1998 | Crowley |
| 6,054,071 A | 4/2000 | Mikkelsen, Jr. |
| 6,055,091 A | 4/2000 | Sheridon et al. |
| 6,097,531 A | 8/2000 | Sheridon |
| 6,124,851 A | 9/2000 | Jacobson |
| 6,128,124 A | 10/2000 | Silverman |
| 6,130,773 A | 10/2000 | Jacobson et al. |
| 6,137,467 A | 10/2000 | Sheridon et al. |
| 6,147,791 A | 11/2000 | Sheridon |
| 6,177,921 B1 | 1/2001 | Comiskey et al. |
| 6,232,950 B1 | 5/2001 | Albert et al. |
| 6,252,564 B1 | 6/2001 | Albert et al. |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,376,828 B1 | 4/2002 | Comiskey |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,480,182 B2 | 11/2002 | Turner et al. |
| 6,498,114 B1 | 12/2002 | Amundson et al. |
| 6,506,438 B2 | 1/2003 | Duthaler et al. |
| 6,518,949 B2 | 2/2003 | Drzaic |
| 6,521,489 B2 | 2/2003 | Duthaler et al. |
| 6,535,197 B1 | 3/2003 | Comiskey et al. |
| 6,545,291 B1 | 4/2003 | Amundson et al. |
| 6,577,496 B1 | 6/2003 | Gioscia et al. |
| 6,639,578 B1 | 10/2003 | Comiskey et al. |
| 6,657,772 B2 | 12/2003 | Loxley |
| 6,664,944 B1 | 12/2003 | Albert et al. |
| D485,294 S | 1/2004 | Albert |
| 6,680,725 B1 | 1/2004 | Jacobson |
| 6,683,333 B2 | 1/2004 | Kazlas et al. |
| 6,724,519 B1 | 4/2004 | Morrison et al. |
| 6,750,473 B2 | 6/2004 | Amundson et al. |
| 6,774,884 B2 | 8/2004 | Shimoda et al. |
| 6,816,147 B2 | 11/2004 | Albert |
| 6,819,471 B2 | 11/2004 | Amundson et al. |
| 6,825,068 B2 | 11/2004 | Denis et al. |
| 6,831,769 B2 | 12/2004 | Holman et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,865,010 B2 | 3/2005 | Duthaler et al. |
| 6,866,760 B2 | 3/2005 | Paolini Jr. et al. |
| 6,870,657 B1 | 3/2005 | Fitzmaurice et al. |
| 6,873,452 B2 | 3/2005 | Tseng et al. |
| 6,909,532 B2 | 6/2005 | Chung et al. |
| 6,922,276 B2 | 7/2005 | Zhang et al. |
| 6,950,220 B2 | 9/2005 | Abramson et al. |
| 6,967,640 B2 | 11/2005 | Albert et al. |
| 6,980,196 B1 | 12/2005 | Turner et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,030,412 B1 | 4/2006 | Drzaic et al. |
| 7,072,095 B2 | 7/2006 | Liang et al. |
| 7,075,502 B1 | 7/2006 | Drzaic et al. |
| 7,075,703 B2 | 7/2006 | O'Neil et al. |
| 7,106,296 B1 | 9/2006 | Jacobson |
| 7,110,163 B2 | 9/2006 | Webber et al. |
| 7,116,318 B2 | 10/2006 | Amundson et al. |
| 7,144,942 B2 | 12/2006 | Zang et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,190,008 B2 | 3/2007 | Amundson et al. |
| 7,206,119 B2 | 4/2007 | Honeyman et al. |
| 7,223,672 B2 | 5/2007 | Kazlas et al. |
| 7,230,751 B2 | 6/2007 | Whitesides et al. |
| 7,256,766 B2 | 8/2007 | Albert et al. |
| 7,259,744 B2 | 8/2007 | Arango et al. |
| 7,280,094 B2 | 10/2007 | Albert |
| 7,301,693 B2 | 11/2007 | Chaug et al. |
| 7,304,780 B2 | 12/2007 | Liu et al. |
| 7,327,346 B2 | 2/2008 | Chung et al. |
| 7,327,511 B2 | 2/2008 | Whitesides et al. |
| 7,339,715 B2 | 3/2008 | Webber et al. |
| 7,347,957 B2 | 3/2008 | Wu et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,382,363 B2 | 6/2008 | Albert et al. |
| 7,388,572 B2 | 6/2008 | Duthaler et al. |
| 7,401,758 B2 | 7/2008 | Liang et al. |
| 7,411,719 B2 | 8/2008 | Paolini, Jr. et al. |
| 7,420,549 B2 | 9/2008 | Jacobson et al. |
| 7,442,587 B2 | 10/2008 | Amundson et al. |
| 7,453,445 B2 | 11/2008 | Amundson |
| 7,492,497 B2 | 2/2009 | Paolini, Jr. et al. |
| 7,535,624 B2 | 5/2009 | Amundson et al. |
| 7,551,346 B2 | 6/2009 | Fazel et al. |
| 7,554,712 B2 | 6/2009 | Patry et al. |
| 7,560,004 B2 | 7/2009 | Pereira et al. |
| 7,583,427 B2 | 9/2009 | Danner et al. |
| 7,598,173 B2 | 10/2009 | Ritenour et al. |
| 7,605,799 B2 | 10/2009 | Amundson et al. |
| 7,636,191 B2 | 12/2009 | Duthaler |
| 7,649,674 B2 | 1/2010 | Danner et al. |
| 7,667,886 B2 | 2/2010 | Danner et al. |
| 7,672,040 B2 | 3/2010 | Sohn et al. |
| 7,679,814 B2 | 3/2010 | Paolini, Jr. et al. |
| 7,688,497 B2 | 3/2010 | Danner et al. |
| 7,715,088 B2 | 5/2010 | Liang et al. |
| 7,733,335 B2 | 6/2010 | Zehner et al. |
| 7,785,988 B2 | 8/2010 | Amundson et al. |
| 7,830,592 B1 | 11/2010 | Sprague et al. |
| 7,839,564 B2 | 11/2010 | Whitesides et al. |
| 7,843,626 B2 | 11/2010 | Amundson et al. |
| 7,859,637 B2 | 12/2010 | Amundson et al. |
| 7,880,958 B2 | 2/2011 | Zang et al. |
| 7,893,435 B2 | 2/2011 | Kazlas et al. |
| 7,898,717 B2 | 3/2011 | Patry et al. |
| 7,905,977 B2 | 3/2011 | Qi et al. |
| 7,957,053 B2 | 6/2011 | Honeyman et al. |
| 7,986,450 B2 | 7/2011 | Cao et al. |
| 8,009,344 B2 | 8/2011 | Danner et al. |
| 8,027,081 B2 | 9/2011 | Danner et al. |
| 8,049,947 B2 | 11/2011 | Danner et al. |
| 8,072,675 B2 | 12/2011 | Lin et al. |
| 8,077,141 B2 | 12/2011 | Duthaler et al. |
| 8,089,453 B2 | 1/2012 | Comiskey et al. |
| 8,120,836 B2 | 2/2012 | Lin et al. |
| 8,151,501 B2 | 4/2012 | Bemelmans et al. |
| 8,159,636 B2 | 4/2012 | Sun et al. |
| 8,208,193 B2 | 6/2012 | Patry et al. |
| 8,237,892 B1 | 8/2012 | Sprague |
| 8,238,021 B2 | 8/2012 | Sprague et al. |
| 8,362,488 B2 | 1/2013 | Chaug et al. |
| 8,373,211 B2 | 2/2013 | Amundson et al. |
| 8,379,377 B2 | 2/2013 | Walters et al. |
| 8,389,381 B2 | 3/2013 | Amundson et al. |
| 8,395,836 B2 | 3/2013 | Lin |
| 8,437,069 B2 | 5/2013 | Lin |
| 8,441,414 B2 | 5/2013 | Lin |
| 8,456,589 B1 | 6/2013 | Sprague et al. |

(56) References Cited

U.S. PATENT DOCUMENTS

| | | | |
|---|---|---|---|
| 8,498,042 B2 | 7/2013 | Danner et al. | |
| 8,514,168 B2 | 8/2013 | Chung et al. | |
| 8,547,628 B2 | 10/2013 | Wu et al. | |
| 8,576,162 B2 | 11/2013 | Kang et al. | |
| 8,605,421 B2 | 12/2013 | Verschoor et al. | |
| 8,610,988 B2 | 12/2013 | Zehner et al. | |
| 8,714,780 B2 | 5/2014 | Ho et al. | |
| 8,728,266 B2 | 5/2014 | Danner et al. | |
| 8,743,077 B1 | 6/2014 | Sprague | |
| 8,754,859 B2 | 6/2014 | Gates et al. | |
| 8,773,398 B2 | 7/2014 | Funo et al. | |
| 8,797,258 B2 | 8/2014 | Sprague | |
| 8,797,633 B1 | 8/2014 | Sprague et al. | |
| 8,797,636 B2 | 8/2014 | Yang et al. | |
| 8,830,560 B2 | 9/2014 | Danner et al. | |
| 8,891,155 B2 | 11/2014 | Danner et al. | |
| 8,969,886 B2 | 3/2015 | Amundson | |
| 8,971,031 B2 | 3/2015 | Mok et al. | |
| 9,025,234 B2 | 5/2015 | Lin | |
| 9,025,238 B2 | 5/2015 | Chan et al. | |
| 9,030,374 B2 | 5/2015 | Sprague et al. | |
| 9,086,850 B2 | 7/2015 | Verschoor et al. | |
| 9,140,952 B2 | 9/2015 | Sprague et al. | |
| 9,147,364 B2 | 9/2015 | Wu et al. | |
| 9,152,003 B2 | 10/2015 | Danner et al. | |
| 9,152,004 B2 | 10/2015 | Paolini, Jr. et al. | |
| 9,152,289 B2 | 10/2015 | Nishikawa et al. | |
| 9,164,547 B1 | 10/2015 | Kwon et al. | |
| 9,173,288 B1 | 10/2015 | Kim | |
| 9,201,279 B2 | 12/2015 | Wu et al. | |
| 9,223,164 B2 | 12/2015 | Lai et al. | |
| 9,279,906 B2 | 3/2016 | Kang | |
| 9,285,648 B2 | 3/2016 | Liu et al. | |
| 9,310,661 B2 | 4/2016 | Wu et al. | |
| 9,348,362 B2 | 5/2016 | Ko et al. | |
| 9,348,450 B1 | 5/2016 | Kim | |
| 9,419,024 B2 | 8/2016 | Ritenour et al. | |
| 9,454,057 B2 | 9/2016 | Wu et al. | |
| 9,529,240 B2 | 12/2016 | Paolini, Jr. et al. | |
| 9,606,574 B2 | 3/2017 | Park et al. | |
| 9,620,066 B2 | 4/2017 | Bishop | |
| 9,671,635 B2 | 6/2017 | Paolini, Jr. | |
| 9,798,359 B2 | 10/2017 | Seo et al. | |
| 2002/0060321 A1 | 5/2002 | Kazlas et al. | |
| 2002/0105600 A1* | 8/2002 | Shimoda | G02F 1/167 348/739 |
| 2004/0085619 A1 | 5/2004 | Wu et al. | |
| 2004/0105036 A1 | 6/2004 | Danner et al. | |
| 2005/0122306 A1 | 6/2005 | Wilcox et al. | |
| 2005/0122563 A1 | 6/2005 | Honeyman et al. | |
| 2006/0215106 A1 | 9/2006 | Kang et al. | |
| 2006/0255322 A1 | 11/2006 | Wu et al. | |
| 2007/0052757 A1 | 3/2007 | Jacobson | |
| 2007/0109219 A1 | 5/2007 | Whitesides | |
| 2008/0061300 A1 | 3/2008 | Chaug et al. | |
| 2008/0149271 A1 | 6/2008 | Qi et al. | |
| 2009/0122389 A1 | 5/2009 | Whitesides et al. | |
| 2009/0315044 A1 | 12/2009 | Amundson et al. | |
| 2010/0177396 A1 | 7/2010 | Lin | |
| 2011/0140744 A1 | 6/2011 | Kazlas et al. | |
| 2011/0187683 A1 | 8/2011 | Wilcox et al. | |
| 2011/0292319 A1 | 12/2011 | Cole | |
| 2013/0278900 A1 | 10/2013 | Hertel et al. | |
| 2014/0078024 A1 | 3/2014 | Paolini, Jr. et al. | |
| 2014/0139501 A1 | 5/2014 | Amundson | |
| 2014/0192000 A1 | 7/2014 | Hung et al. | |
| 2014/0210701 A1 | 7/2014 | Wu et al. | |
| 2014/0300837 A1 | 10/2014 | Gates et al. | |
| 2014/0368753 A1 | 12/2014 | Cheng et al. | |
| 2014/0376164 A1 | 12/2014 | Huang et al. | |
| 2015/0177909 A1* | 6/2015 | Hoffman | G06F 3/042 345/175 |
| 2015/0226986 A1 | 8/2015 | Paolini, Jr. et al. | |
| 2015/0227018 A1 | 8/2015 | Paolini, Jr. et al. | |
| 2015/0241925 A1* | 8/2015 | Seo | G06F 1/1652 361/679.27 |
| 2015/0261057 A1 | 9/2015 | Harris et al. | |
| 2015/0346866 A1* | 12/2015 | Kusunoki | G06F 3/044 345/174 |
| 2015/0356927 A1 | 12/2015 | Hung | |
| 2015/0378235 A1 | 12/2015 | Lin et al. | |
| 2016/0077375 A1 | 3/2016 | Lin | |
| 2016/0103380 A1 | 4/2016 | Kayal et al. | |
| 2016/0187759 A1 | 6/2016 | Wu et al. | |
| 2016/0291760 A1* | 10/2016 | Fleck | G06F 3/03545 |
| 2018/0095502 A1 | 4/2018 | Yamazaki et al. | |

FOREIGN PATENT DOCUMENTS

| | | |
|---|---|---|
| WO | 2000005704 A1 | 2/2000 |
| WO | 2000038000 A1 | 6/2000 |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991). Oct. 24, 1991.

Bach, U. et al., "Nanomaterials-Based Electrochromics for Paper-Quality Displays", Adv. Mater., vol. 14, No. 11, pp. 845-848 (Jun. 2002). Jun. 5, 2002.

Hayes, R.A. et al., "Video-Speed Electronic Paper Based on Electrowetting", Nature, vol. 425, No. 25, pp. 383-385 (Sep. 2003). Sep. 25, 2003.

Korean Intellectual Property Office, PCT/US2018/033359, International Search Report and Written Opinion, Nov. 28, 2018.

\* cited by examiner

Unfixed Region

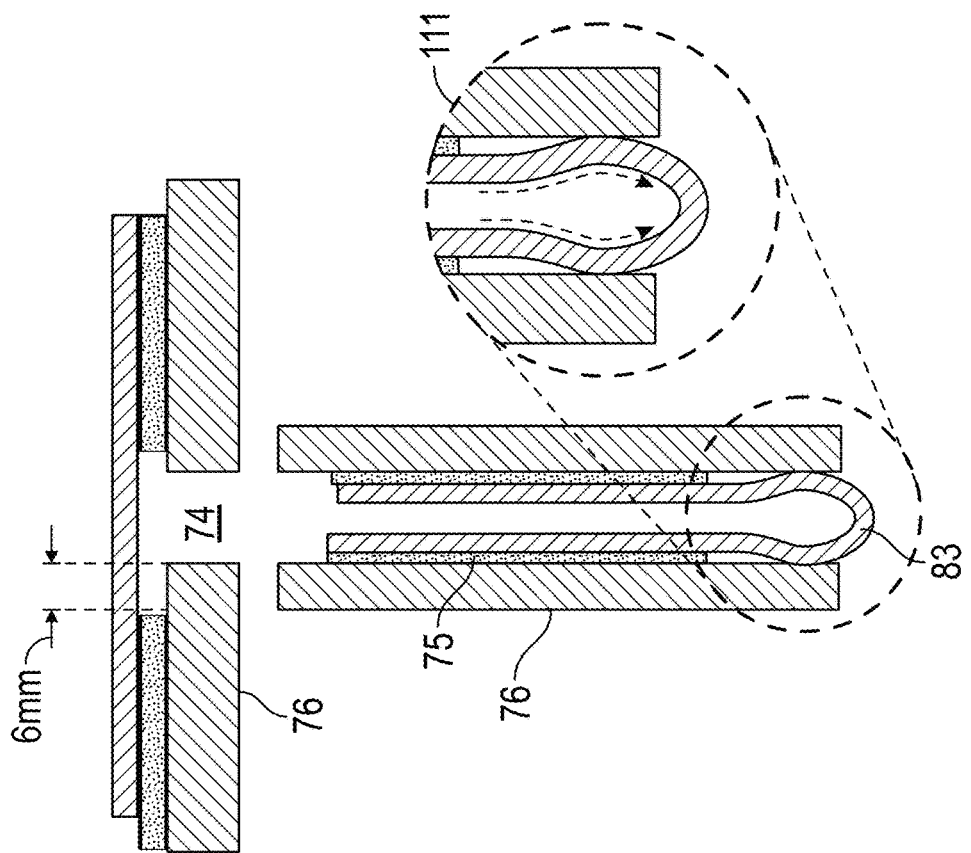
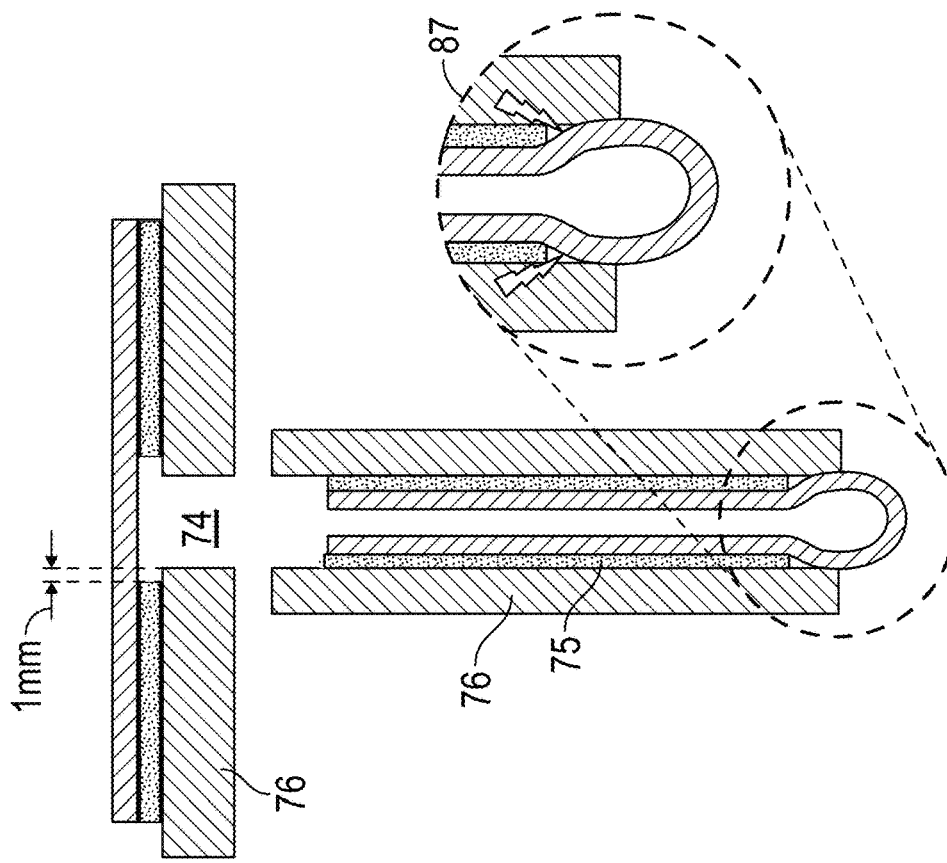

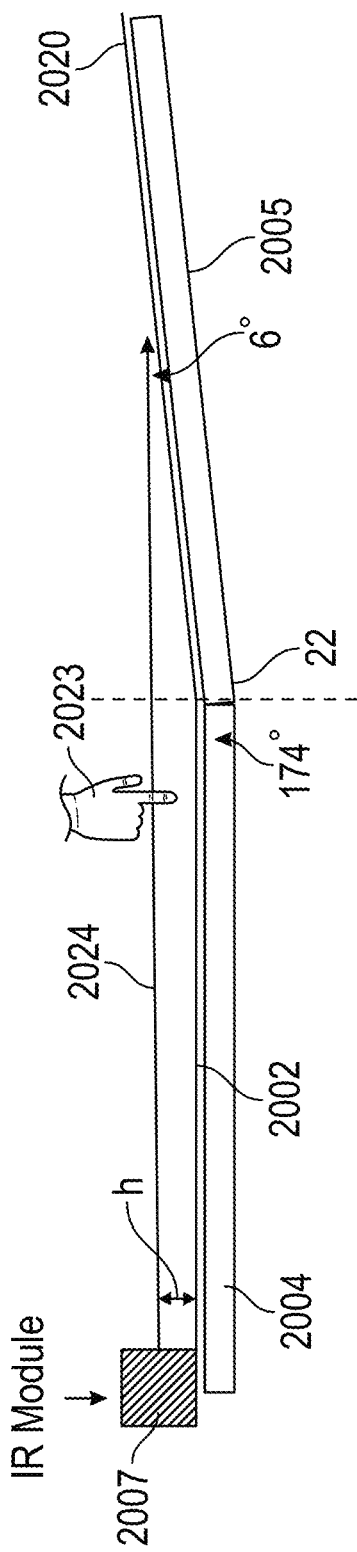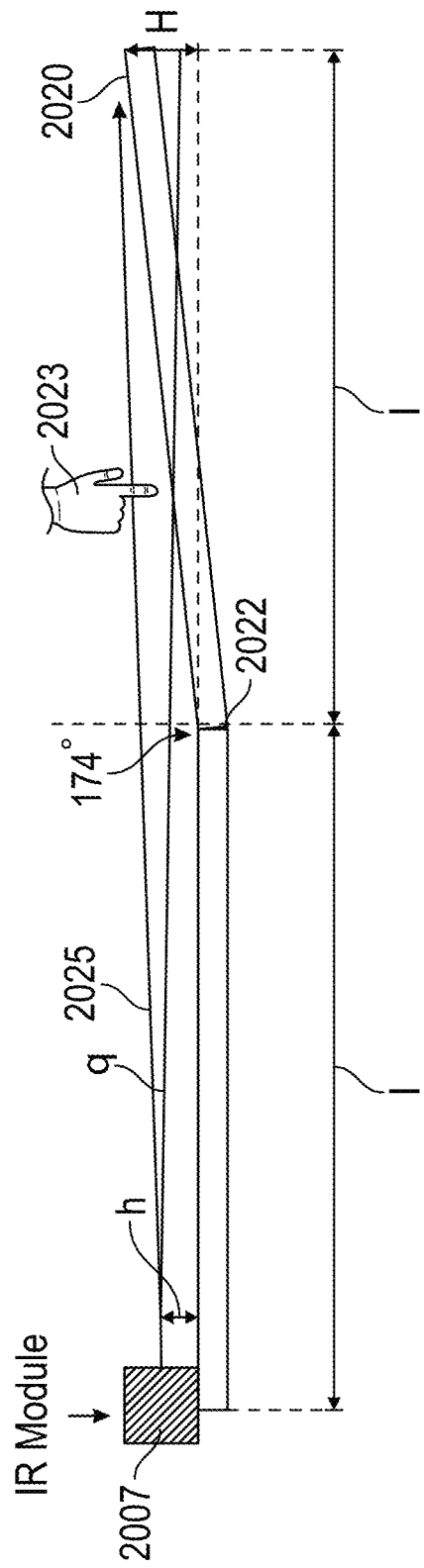
FIG. 22A
FIG. 22B

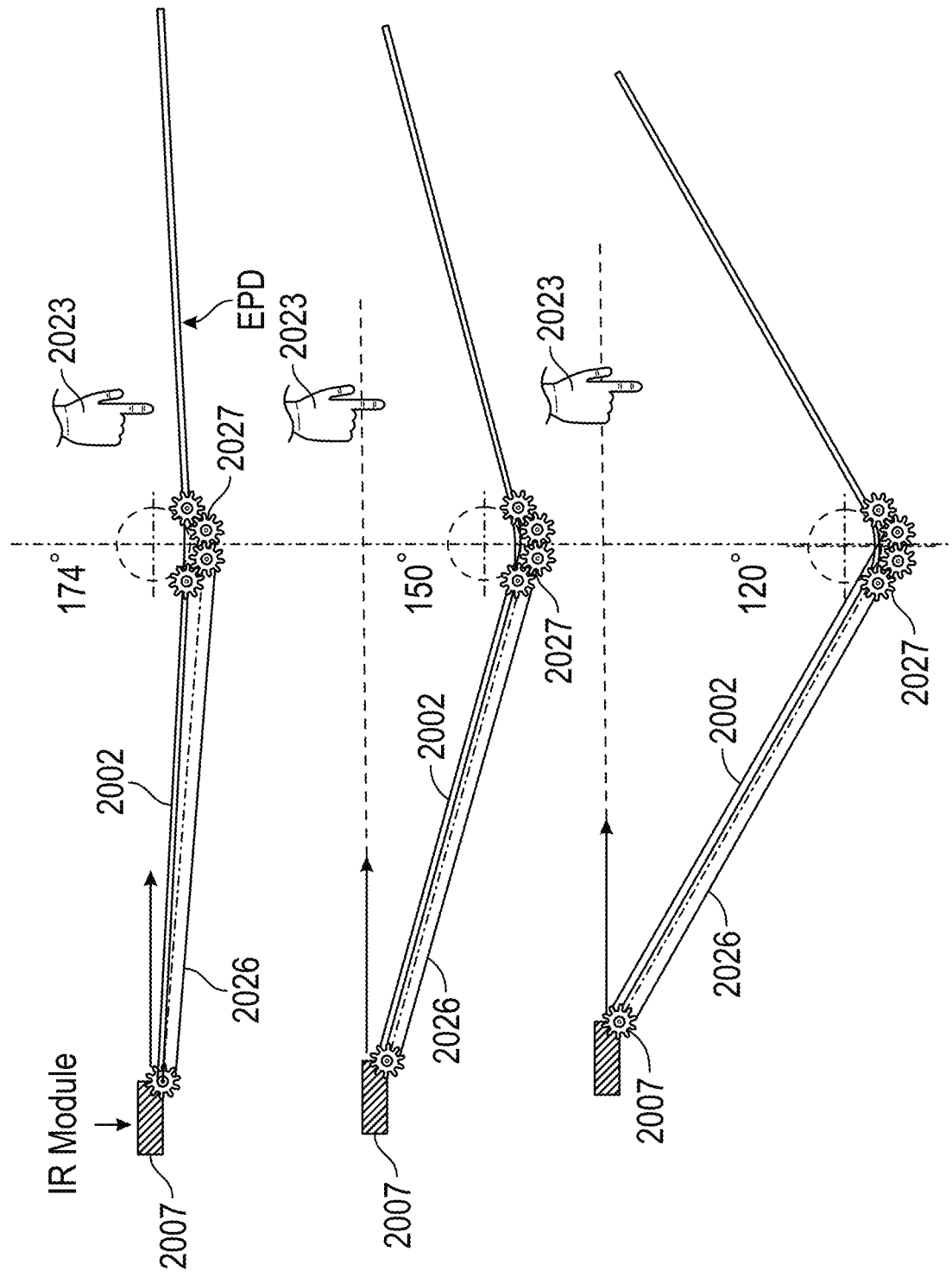

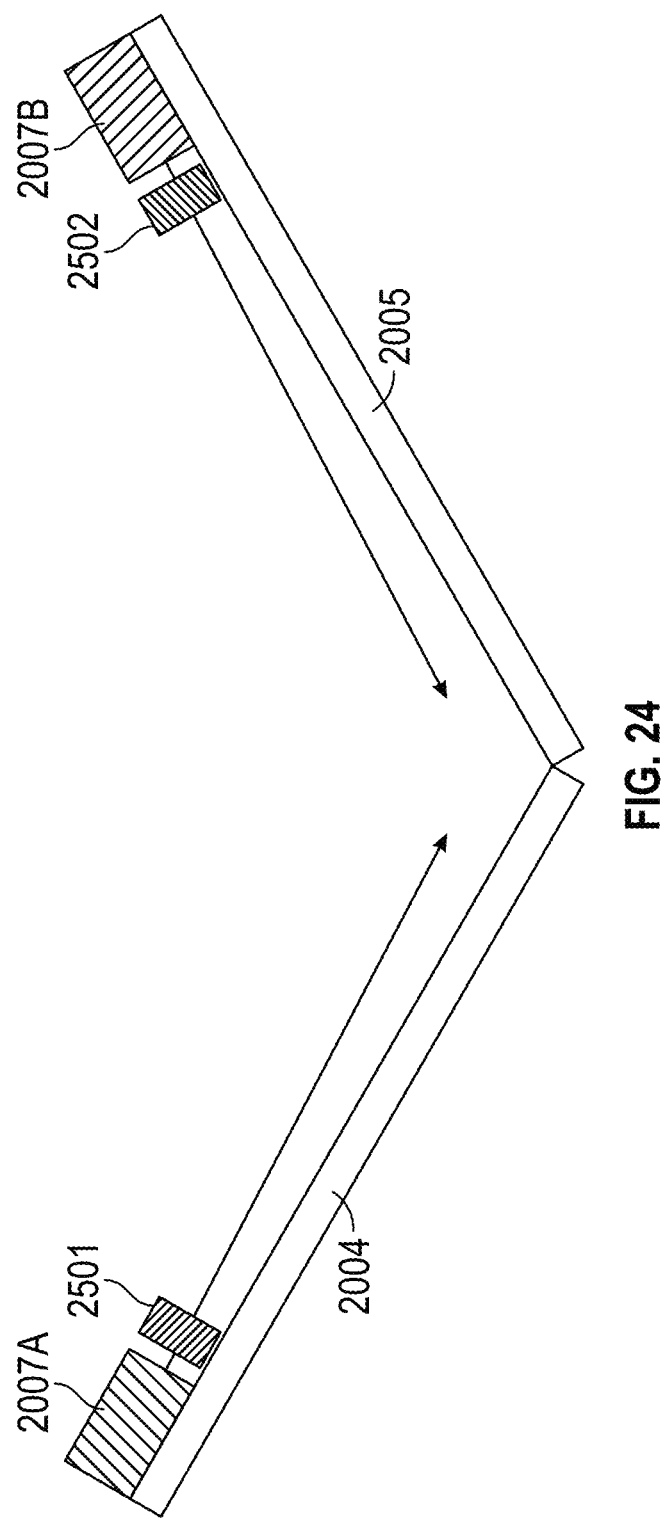

FOLDABLE ELECTRO-OPTIC DISPLAY INCLUDING DIGITIZATION AND TOUCH SENSING

RELATED APPLICATIONS

This application claims priority to U.S. Provisional Application No. 62/508,502, filed May 19, 2017 and U.S. Provisional Application No. 62/614,487, filed Jan. 7, 2018. The priority applications and all other patents and applications listed herein are incorporated by reference in their entireties.

SUBJECT OF THE INVENTION

This invention relates to reflective electro-optic display apparatuses and materials for use in such displays. More specifically, this invention relates to flexible electro-optic displays that may be folded in a book-like fashion. In some embodiments, the foldable devices and sense touch. In some embodiments, the foldable devices can track the location of a stylus used to write on the device.

BACKGROUND OF INVENTION

This invention relates to backplanes for electro-optic displays, and to processes for the formation of such backplanes. The backplanes of the present invention are especially, but not exclusively, intended for use with particle-based electrophoretic displays in which one or more types of electrically charged particles are suspended in a liquid and are moved through the liquid under the influence of an electric field to change the appearance of the display.

In some instances, a flexible display may be folded for portability and/or convenience of storage. If the display was simply folded in a book like fashion, it may be folded with a radius of curvature that is smaller than a minimum radius of curvature designed to prevent display breakage. To prevent such problem, various mechanisms, such as hinges and/or other structures, have been implemented to the bending portions of the display. For example Polymer Vision has disclosed a product Readius™ using one or more mechanical hinge mechanisms to facilitate the folding of the flexible display.

In another example, Japanese Patent Laid-Open Publication No. 2014-161009 discloses a flexible mobile terminal device configured to bend at various angles. The terminal device is proposed to include a folding portion for bending the device to a front surface or a rear upper position of a terminal device body. A flexible display mounted on an upper portion of the terminal device body can be bend to the front surface or a rear surface depending on a bending direction of the folding portion. The device further includes a sliding portion for causing one end of the flexible display to slide by a difference between degrees of compression/tension generated by a difference in extension rates of the folding portion and the flexible display during bending of the folding portion.

Both examples described above result in thick and heavy products. The Readius™ by Polymer Vision employs mechanical hinge mechanisms that are complex in structure and bulky in shape. The device of Japanese Patent Laid-Open Publication No. 2014-161009 has a bellows shape and the sliding portion takes labor to adjust, and the device is also complex and bulky.

An additional limitation of book-like flexible electro-optic displays of the prior art is that a portion of the flexible electro-optic display(s) may not assume a flattened position after repeated openings and closings. In particular, the fold area may become "wrinkly" making it difficult to read across the bended portion. In other devices, where the flexible display is allowed to "float" so that it can move with respect to the frame, the display may not flatten fully, or worse yet, it may move while the user is reading. The present invention addresses many of these issues and provides a foldable electro-optic display that is flexible, thin, and light-weight, and may be folded in a book-like fashion.

SUMMARY OF INVENTION

This invention provides an image display apparatus having a flexible electro-optic display. The flexible electro-optic display can include a bendable portion that is flexible and configured to display an image, however portions of the flexible electro-optic display may not be bendable. Specifically, the image display apparatus of the present application comprises an image display apparatus including a flexible electro-optic display including two planar portions and a bendable portion. The bendable portion is flexible and capable of displaying an image. Each planar support member comprises a fixed region and an unfixed region. The fixed region is coupled to and supports one of the planar portions of the flexible electro-optic display, while the unfixed region is not coupled to the flexible electro-optic display. The image display apparatus includes a bending mechanism comprising two separate axes of rotation that are parallel to a center line defined by the flexible electro-optic display. Each of the two axes are set apart from the center line by a predetermined distance, and each of the axes defines a pivot of one of the planar support members. Each pivot is in proximity to a boundary between the fixed region and the unfixed region of the planar support member. The disclosed design protects the flexible electro-optic display from being bent excessively (with a small radius of curvature) and thereby protects against breakage. Because much of the flexible electro-optic display is affixed to a planar support member, the overall display exhibits high flatness when in the open state and also maintains the open state stably.

In some embodiments, the flexible electro-optic display comprises an electrophoretic medium, which may optionally be encapsulated or distributed in a plurality of microcells.

In some embodiments, the flexible electro-optic display is bonded to the planar support member in the fixed region, e.g., with an adhesive. In some embodiments, each of the two separate axes of rotation includes a rotation gear at a proximal end, and the bending mechanism further comprises a rotation synchronizer for synchronizing rotation of the rotation gears. The rotation synchronizer may include two synchronizing gears, wherein each of the synchronizing gears is engaged with the other synchronization gears and one of the rotation gears. In some embodiments, the bending mechanism includes an empty volume exceeding the volume swept by rotation of the unfixed region of the two planar support members about their respective axes.

In some embodiments, the planar support members are substantially rectangular. If a length "l" is defined as the distance between the axes, and "R" is the minimum radius of curvature for operation of the flexible electro-optic display, "l" and "R" are related as l>2*R. If a distance "a" is defined as the distance from an axis to the nearest edge of a fixed region, and "R" is the minimum radius of curvature for operation of the flexible electro-optic display, "a" and "R" are related by a>π*R. Of course, l and a may be larger, and typically 2a>l.

In some embodiments, the flexible electro-optic display comprises a flexible backplane including an array of pixels. Some of the flexible backplanes will include at least 100 pixels for each 2.5 cm of linear distance across the backplane. The flexible backplanes may include thin film transistors constructed from doped polymers. The flexible backplanes may include flexible traces fabricated from conductive polymers or polymers including conductive materials such as metals, nanoparticles, nanowires, nanotubes, graphite, or graphene.

In some embodiments, a portion of the flexible electro-optic display is configured to slide freely against a support member or a digitization layer, thereby facilitating smooth closure of the device and discouraging wrinkling in the flexible display after repeated folding actions.

In some embodiments, the foldable display device includes a digitization layer which allows the position of a stylus to be tracked, and "writing" to be achieved on the device. In some embodiments, the foldable display device includes a touch sensor that can be used to detect the presence of, e.g., a finger of a user. Touch sensing can be provided as the device is folded by synchronizing the position of the touch sensor as the device is closed, or by using different touch sensors which sense different wavelengths of light.

BRIEF DESCRIPTION OF DRAWINGS

FIG. 10A illustrates undesired backward bending (stretching) of the flexible display;

FIG. 10B illustrates an extended low slope for use when some backward bending (stretching) is unavoidable, e.g., because of thickness restrictions;

FIG. 22A shows the extent of touch sensing with a collimated light source;

FIG. 22B shows the extent of touch sensing with a light source having an angle of emission, $\theta$;

FIG. 23 illustrates the folding process in a foldable display having a touch sensor unit that rotates with the folding of the device. As the device is folded, the touch sensor rotates upward to increase coverage of the flexible display layer;

FIG. 24 illustrates an alternate design for sensing touch on the separate portions of a foldable display device.

DETAILED DESCRIPTION

Figure 1:
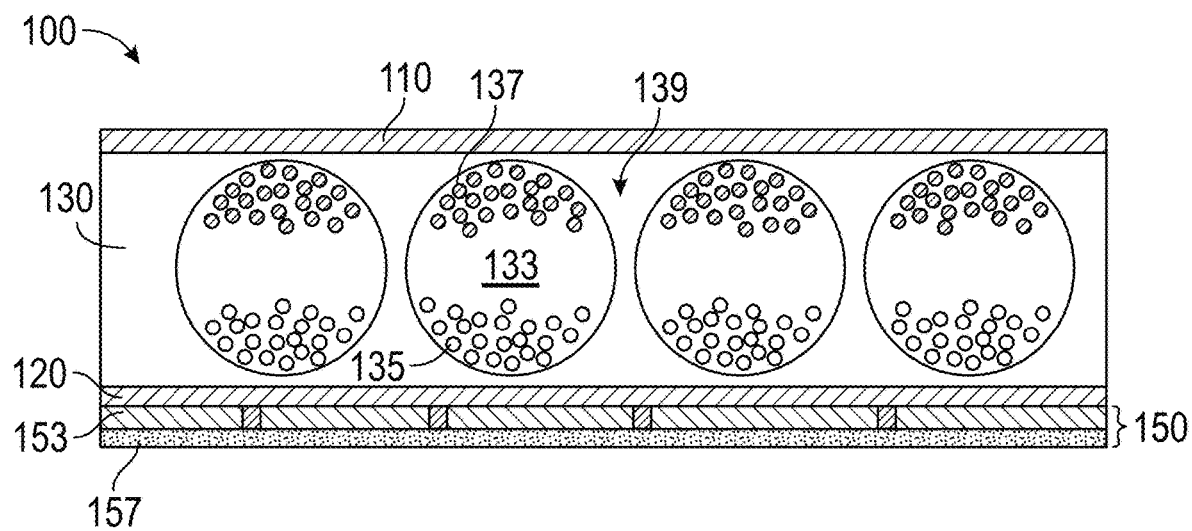
FIG. 1 is a general depiction of an electrophoretic medium, suitable for use in the invention.

As indicated above, the present invention provides an electro-optic display that is flexible and may be folded in a book-like fashion. The display apparatus may include a flexible display and a bending mechanism for accommodating the flexible display in a closed state. Because of the advanced design of the bending mechanism, portions of the flexible electro-optic display can be coupled to regions of the planar support members so that when the display is in an open state, the display lays flat and smooth.

The invention can be used with various electro-optic materials, such as liquid crystal displays, light emitting displays (including OLEDS), and cholesteric liquid crystal displays. The invention is well suited to be used with electrophoretic media of the type developed by E Ink Corporation (Billerica, Mass.) and described in the patents and patent publications listed below. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include: (a) Electrophoretic particles, fluids and fluid additives; see for example U.S. Pat. Nos. 7,002,728 and 7,679,814; (b) Capsules, binders and encapsulation processes; see for example U.S. Pat. Nos. 6,922,276 and 7,411,719; (c) Microcell structures, wall materials, and methods of forming microcells; see for example U.S. Pat. Nos. 7,072,095 and 9,279,906; (d) Methods for filling and sealing microcells; see for example U.S. Pat. Nos. 7,144,942 and 7,715,088; (e) Films and sub-assemblies containing electro-optic materials; see for example U.S. Pat. Nos. 6,982,178 and 7,839,564; (f) Backplanes, adhesive layers and other auxiliary layers and methods used in displays; see for example U.S. Pat. Nos. D485,294; 6,124,851; 6,130,773; 6,177,921; 6,232,950; 6,252,564; 6,312,304; 6,312,971; 6,376,828; 6,392,786; 6,413,790; 6,422,687; 6,445,374; 6,480,182; 6,498,114; 6,506,438; 6,518,949; 6,521,489; 6,535,197; 6,545,291; 6,639,578; 6,657,772; 6,664,944; 6,680,725; 6,683,333; 6,724,519; 6,750,473; 6,816,147; 6,819,471; 6,825,068; 6,831,769; 6,842,167; 6,842,279; 6,842,657; 6,865,010; 6,873,452; 6,909,532; 6,967,640; 6,980,196; 7,012,735; 7,030,412; 7,075,703; 7,106,296; 7,110,163; 7,116,318; 7,148,128; 7,167,155; 7,173,752; 7,176,880; 7,190,008; 7,206,119; 7,223,672; 7,230,751; 7,256,766; 7,259,744; 7,280,094; 7,301,693; 7,304,780; 7,327,511; 7,347,957; 7,349,148; 7,352,353; 7,365,394; 7,365,733; 7,382,363; 7,388,572; 7,401,758; 7,442,587; 7,492,497; 7,535,624; 7,551,346; 7,554,712; 7,583,427; 7,598,173; 7,605,799; 7,636,191; 7,649,674; 7,667,886; 7,672,040; 7,688,497; 7,733,335; 7,785,988; 7,830,592; 7,843,626; 7,859,637; 7,880,958; 7,893,435; 7,898,717; 7,905,977; 7,957,053; 7,986,450; 8,009,344; 8,027,081; 8,049,947; 8,072,675; 8,077,141; 8,089,453; 8,120,836; 8,159,636; 8,208,193; 8,237,892; 8,238,021; 8,362,488; 8,373,211; 8,389,381; 8,395,836; 8,437,069; 8,441,414; 8,456,589; 8,498,042; 8,514,168; 8,547,628; 8,576,162; 8,610,988; 8,714,780; 8,728,266; 8,743,077; 8,754,859; 8,797,258; 8,797,633; 8,797,636; 8,830,560; 8,891,155; 8,969,886; 9,147,364; 9,025,234; 9,025,238; 9,030,374; 9,140,952; 9,152,003; 9,152,004; 9,201,279; 9,223,164; 9,285,648; and 9,310,661; and U.S. Patent Applications Publication Nos. 2002/0060321; 2004/0008179; 2004/0085619; 2004/0105036; 2004/0112525; 2005/0122306; 2005/0122563; 2006/0215106; 2006/0255322; 2007/0052757; 2007/0097489; 2007/0109219; 2008/0061300; 2008/0149271; 2009/0122389; 2009/0315044; 2010/0177396; 2011/0140744; 2011/0187683; 2011/0187689; 2011/0292319; 2013/0250397; 2013/0278900; 2014/0078024; 2014/0139501; 2014/0192000; 2014/0210701; 2014/0300837; 2014/0368753; 2014/0376164; 2015/0171112; 2015/0205178; 2015/0226986; 2015/0227018; 2015/0228666; 2015/0261057; 2015/0356927; 2015/0378235; 2016/077375; 2016/0103380; and 2016/0187759; and International Application Publication No. WO 00/38000; European Patents Nos. 1,099,207 B1 and 1,145,072 B1; (g) Color formation and color adjustment; see for example U.S. Pat. Nos. 7,075,502 and 7,839,564; and (h) Methods for driving displays; see for example U.S. Pat. Nos. 7,012,600 and 7,453,445. All of the patents and patent applications listed herein are incorporated by reference in their entirety. Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

While the invention is primarily directed to electrophoretic media of the type described above and in the listed patents and patent applications, other types of electro-optic materials may also be used in the present invention. The alternative electro-optic media are typically reflective in nature, that is, they rely on ambient lighting for illumination instead of a backlight source, as found in an emissive LCD display. Alternative electro-optic media include rotating bichromal member type media as described, for example, in U.S. Pat. Nos. 5,808,783; 5,777,782; 5,760,761; 6,054,071 6,055,091; 6,097,531; 6,128,124; 6,137,467; and 6,147,791. Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another alternative electro-optic display medium is electrochromic, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

An exemplary electrophoretic display (EPID) is show in FIG. 1. Display 100 normally comprises a layer of electrophoretic material 130 and at least two other layers 110 and 120 disposed on opposed sides of the electrophoretic material 130, at least one of these two layers being an electrode layer, e.g., as depicted by layer 110 in FIG. 1. The front electrode 110 may represent the viewing side of the display 100, in which case the front electrode 110 may be a transparent conductor, such as Indium Tin Oxide (ITO) (which in some cases may be deposited onto a transparent substrate, such as polyethylene terephthalate (PET)). In the flexible displays of the invention, other flexible conductive materials such as conductive polymers or polymers with conductive additives may be used for the front electrode. Such EPIDs also include, as illustrated in FIG. 1, a backplane 150, comprising a plurality of driving electrodes 153 and a substrate layer 157. The layer of electrophoretic material 130 may include microcapsules 133, holding electrophoretic pigment particles 135 and 137 and a solvent, with the microcapsules 133 dispersed in a polymeric binder 139. Nonetheless, it is understood that the electrophoretic medium (particles 135 and 137 and solvent) may be enclosed in microcells (microcups) or distributed in a polymer without a surrounding microcapsule (e.g., PDEPID design described above). Typically, the pigment particles 137 and 135 are controlled (displaced) with an electric field produced between the front electrode 110 and the pixel electrodes 153. In many conventional EPIDs the electrical driving waveforms are transmitted to the pixel electrodes 153 via conductive traces (not shown) that are coupled to thin-film transistors (TFTs) that allow the pixel electrodes to be addressed in a row-column addressing scheme. In some embodiments, the front electrode 110 is merely grounded and the image driven by providing positive and negative potentials to the pixel electrodes 153, which are individually addressable. In other embodiments, a potential may also be applied to the front electrode 110 to provide a greater variation in the fields that can be provided between the front electrode and the pixel electrodes 153.

Figure 2:
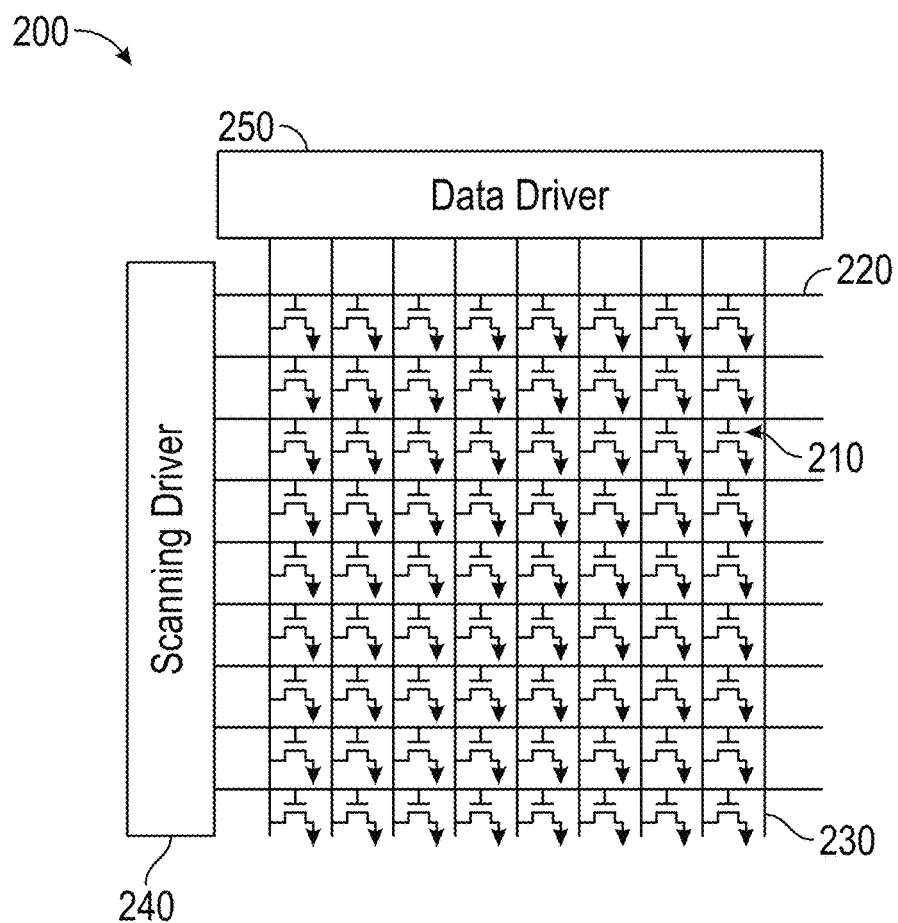
FIG. 2 is a general depiction of a flexible thin film transistor (TFT) array, suitable for use in the invention.

In many embodiments, the TFT array forms an active matrix for image driving, as shown in FIG. 2. For example, each pixel electrode (153 in FIG. 1) is coupled to a thin-film transistor 210 patterned into an array, and connected to elongate row electrodes 220 and elongate column electrodes 230, running at right angles to the row electrodes 220. In some embodiments, the pixels comprise transistors fabricated from metal oxides. In some embodiments, the pixels comprise transistors formed from doped polymers. In some embodiments, one electrode layer has the form of a single continuous electrode and the other electrode layer is patterned into a matrix of pixel electrodes, each of which defines one pixel of the display. As shown in FIG. 2, the data driver 250 is connected to the column electrodes 230 and provides source voltage to all TFTs in a column that are to be addressed. The scanning driver 240 is connected to the row electrodes 220 to provide a bias voltage that will open (or close) the gates of each TFT along the row. The gate scanning rate is typically ~60-100 Hz. Taking the gate-source voltage positive allows the source voltage to be shorted to the drain. Taking the gate negative with respect to the source causes the drain source currents to drop and the drain effectively floats. Because the scan driver acts in a sequential fashion, there is typically some measurable delay in update time between the top and bottom row electrodes. It is understood that the assignment of "row" and "column" electrodes is somewhat arbitrary and that a TFT array could be fabricated with the roles of the row and column electrodes interchanged. In some embodiments, the TFT array is substantially flexible, however individual components, such as individual pixel transistors or driver circuits may not be flexible. The flexible traces for supply voltages to the individual pixels may be formed from flexible materials, such as conductive polymers, or polymers doped with conductive materials such as metal particles, nanoparticles, nanowires, nanotubes, graphite, and graphene.

While EPID media are described as "black/white," they are typically driven to a plurality of different states between black and white to achieve various tones or "greyscale." Additionally, a given pixel may be driven between first and second grayscale states (which include the endpoints of white and black) by driving the pixel through a transition from an initial gray level to a final gray level (which may or may not be different from the initial gray level). The term "waveform" will be used to denote the entire voltage against time curve used to effect the transition from one specific initial gray level to a specific final gray level. Typically, such a waveform will comprise a plurality of waveform elements; where these elements are essentially rectangular (i.e., where a given element comprises application of a constant voltage for a period of time); the elements may be called "pulses" or "drive pulses." The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible to use more than one drive scheme simultaneously in different areas of the same display, and a set of drive schemes used in this manner may be referred to as "a set of simultaneous drive schemes."

The manufacture of a three-layer electrophoretic display normally involves at least one lamination operation. For example, in several of the aforementioned patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane (see FIG. 1), containing an array of pixel electrodes and an appropriate arrangement of conductors to connect the pixel electrodes to drive circuitry (see FIG. 2), is prepared. To form the final display, the substrate having the capsule/binder layer thereon is laminated to the backplane using a lamination adhesive. In embodiments where it is desired to have additional layers, such as a digitizing sensor layer (Wacom Technologies, Portland, Oreg.), those layers may be inserted between the electrode layer and the substrate, or an additional substrate may be added between the electrode layer and the additional layer. In one preferred embodiment, the backplane is itself flexible and is prepared by printing the pixel electrodes and conductors on a plastic film or other flexible substrate. The lamination technique for mass production of displays by this process is roll lamination using a lamination adhesive.

During the lamination process, one or more lamination adhesives are used to provide mechanical continuity to the stack of components and also to assure that the layers are relatively planar with respect to each other. In some instances commercial lamination adhesives (lamad) can be used, however, manufacturers of lamination adhesives (naturally) devote considerable effort to ensuring that properties, such as strength of adhesion and lamination temperatures, while ignoring the electrical properties of the lamination adhesive. Accordingly, manufactures of electrophoretic displays typically modify commercial adhesives to achieve the needed volume resistivity. Methods for modifying the electrical properties of commercial adhesives are described in several of the before-mentioned patents. The methods typically involve adding charged copolymers, charged moieties, or conductive particles.

Figure 3A:
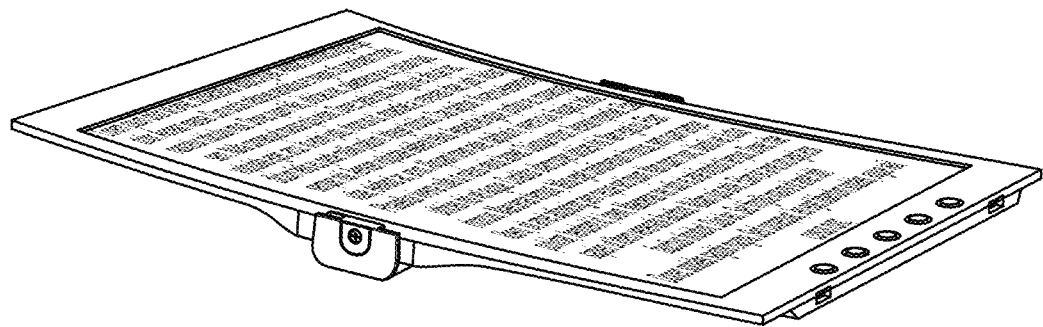
FIG. 3A demonstrates an embodiment of the invention in an open state.
Figure 3B:
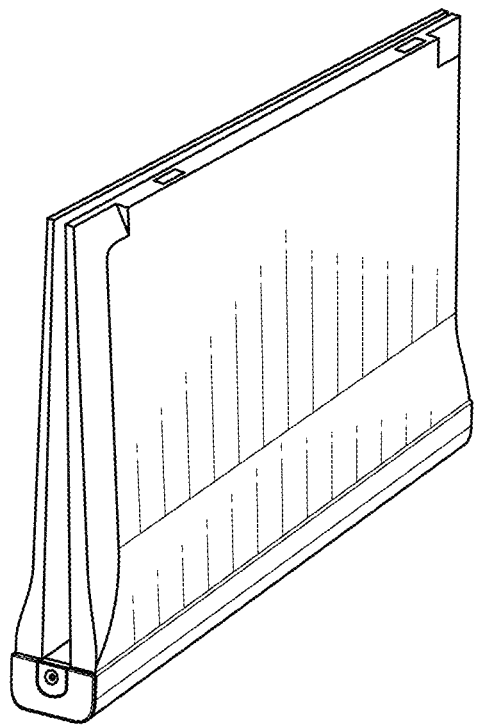
FIG. 3B demonstrates an embodiment of the invention in a closed state.

FIGS. 3A and 3B are views illustrating an electronic book which is an example of an image display apparatus of the present application. As illustrated in the figures, although a folding portion is comparatively thick, the electronic book has a thickness of approximately equivalent to an ordinary book and it can be used with a feeling of carrying a thin book, and by retaining it in a hand in a folded state as illustrated in FIG. 3B, for example, the electronic book can be stably carried like an ordinary book. Moreover, if it is fully open, it has a substantially flat shape as illustrated in FIG. 3A, but by means of the invention of the present application, since a flexible display is not bent/broken and flatness of the flexible display can be kept at the open state even if the electronic book is closed, and the whole screen can be used without distortion.

Figure 4A:
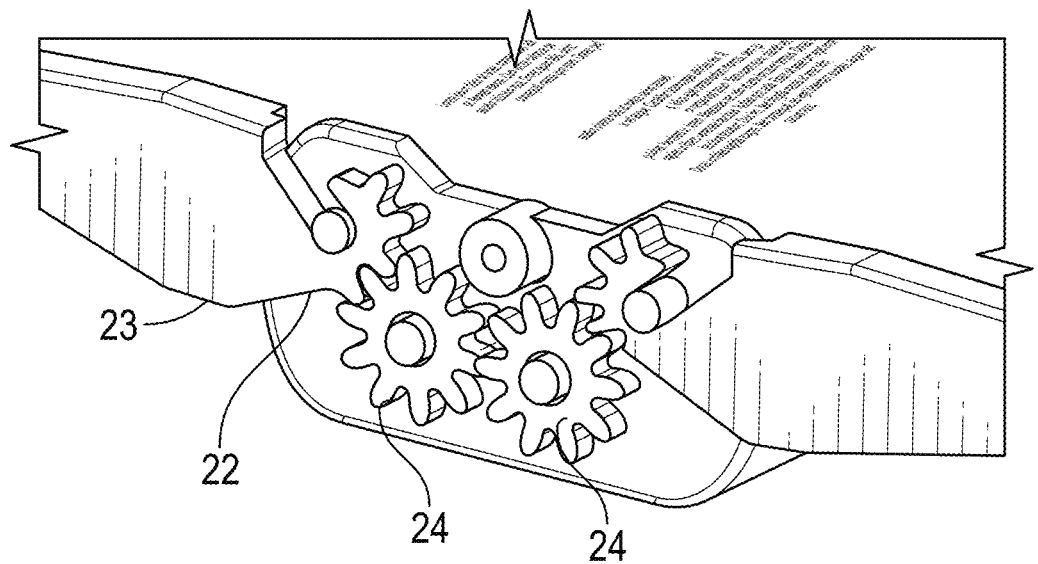
FIG. 4A is a detailed view of a rotation synchronizer including synchronizing gears and rotation gears coupled to the axes about which the planar support members rotate.
Figure 4B:
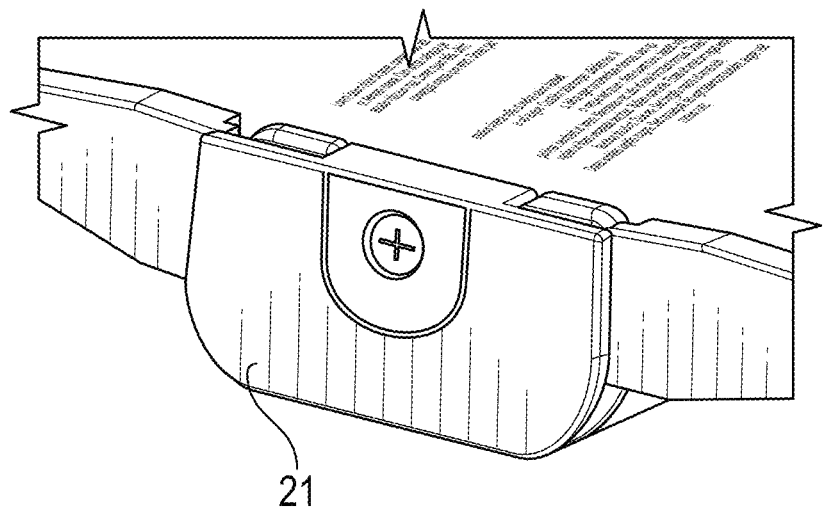
FIG. 4B is a detailed view of the rotation synchronizer covered by an end cap.

FIGS. 4A and 4B are views illustrating a hinge portion of an example of an image display apparatus of the present application. As indicated in FIG. 4A, the rotation gear 22 is provided at the proximal end of the axis of rotation 23 and the image display apparatus can be opened and closed in a synchronous fashion by engaging the axis 23 to synchronizing gear 24. Typically, the two rotation gears 22 of the axes of rotation 23 are respectively engaged via two synchronizing gears 24 and the two synchronizing gears are engaged each other. By this design, the movement of each of the two planar support members is coordinated, assuring that the flexible electro-optic display moves in a smooth and synchronized fashion. Accordingly, since both covers of the electronic book open and close at the same angle, it is trivial to open and close the book with one hand. Although one edge side is only indicated in FIG. 4A, the gears are provided at both sides of the axes. Additionally, as indicated in FIG. 4B, the hinge portion is typically covered by a cap 21 at the time of use to prevent ingress of dirt which may impede function of the gears and to prevent the gears from pinching the hand of a user. It should be noted that the rotation gears and synchronization gears shown in FIGS. 4A and 4B are exemplary. The gears may be complete circles or they may be partial circles. Other shapes which provide similar function may also be used.

Flexible Display Bending Configuration

Figure 5A:
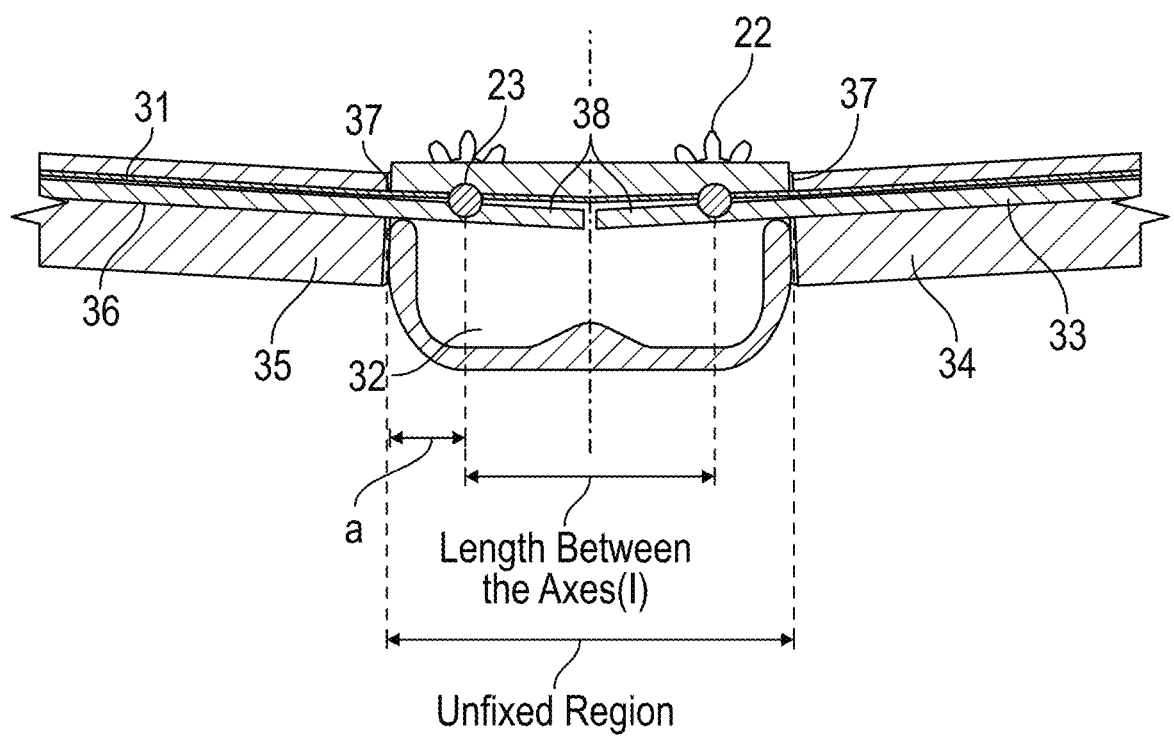
FIG. 5A is an end-on view of an embodiment of an image display apparatus showing greater detail of the bending mechanism.

Details of the synchronized bending process are described in greater detail with respect to FIGS. 5A-6D. FIG. 5A illustrates the end view of an image display apparatus including the hinge portion. FIG. 5B illustrates a top view of an image display apparatus showing that the axes of rotation are offset on either side a center line of the flexible electro-optic display. FIGS. 6A to 6D indicate the changes in the end view of the hinge portion when the image display apparatus is bent from an open state to a folded state.

Figure 5B:
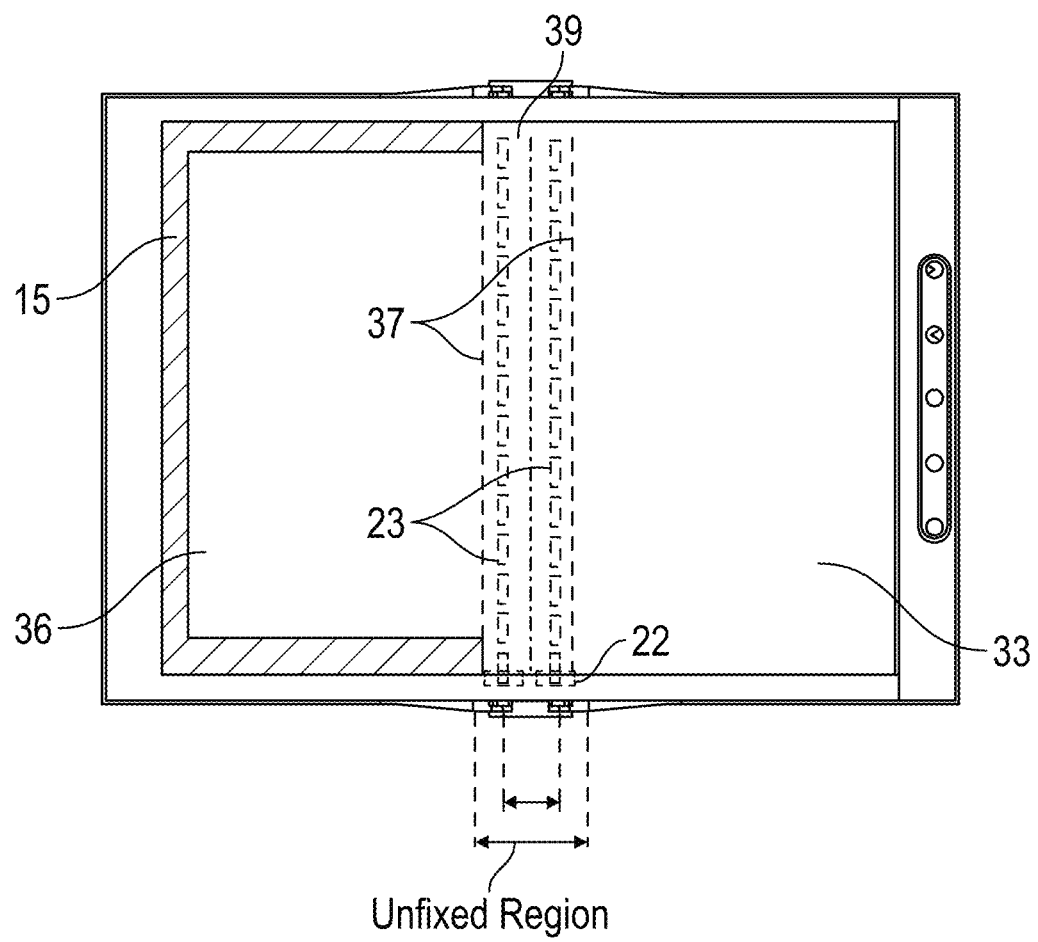
FIG. 5B is a top view of an embodiment of an image display apparatus, showing the displacement between the two axes "l" as well as the unfixed region over which the flexible electrophoretic display is not coupled to the planar support members.
Figure 5C:
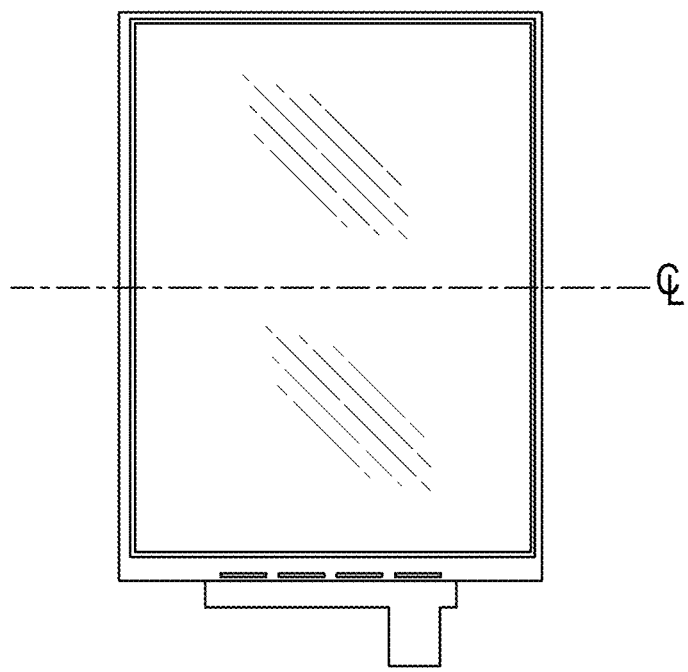
FIG. 5C shows a flexible electro-optic display removed from the image display apparatus.

In general an image display apparatus includes two planar support members 33 and 36, which are partially affixed to the flexible electro-optic display 31. In some embodiments, the electro-optic display 31 is affixed to the planar support members 33 and 36 with an adhesive layer. In such embodiments, the planar support members 33 and 36 are rectangles and the axis of rotation 23 is a predetermined distance from an edge 38 of the rectangle and parallel to the center line 39. Of course, the planar support members are not limited to rectangles as long as the planar support members can support the flexible display. While each planar support member rotates along the axis 23 up to 90° of travel, the axis of rotation 23 is at a certain distance from the edge 38 of the planar support member, whereas the region between the axis 23 and the edge 38 is called the unfixed region, defined by a boundary 37. As indicated in FIG. 5B, planar support members 33 and 36 each rotate upon the axes 23. In order to give the final image display apparatus a more finished look, the planar support members 33 and 36 are covered with covering 34 and 35 which may be any suitable material, such as plastic, cloth, or leather.

As discussed previously, there is a minimum radius of curvature "R" that limits the safe radius of bending in the flexible electro-optic display. (The location of R is shown explicitly in FIG. 6D.) As shown in FIG. 5A, this minimum radius of curvature can be related to the distance between the axes 23, herein "l," as well as the distance between the axis 23 and the boundary 37 between the fixed and unfixed regions on the planar support members, herein "a." Of course, if the flexible electro-optic display is bent beyond the minimum radius of curvature breakage is expected. If the deflected portion of the flexible electro-optic display is small, and the flexible display in the flattened state is substantially horizontal, the unfixed region of the flexible electro-optic display can be treated as a semi-circle of a length from one boundary of the fixed and unfixed region to the next. See FIG. 6D. Accordingly, in this minimum configuration, the distance between the axes, which allows the bending portion of the flexible electro-optic display to fit between the axes must be at least twice the minimum radius, thus l>2*R. Of course, in practice "l" should be a bit wider to account for both the thickness of the axes as well as the thickness of the flexible electro-optic display. Thus, in some embodiments, it is preferable to have l>2.5*R or l>3*R.

The extent of the unfixed region is more easily visualized in FIG. 5B, which shows an overhead view of an open foldable device. The distance "l," i.e., the distance between the axis, as well as the larger gap between the fixed and unfixed regions on the planar support members can be seen in FIG. 5B. The region 15 shown in FIG. 5B corresponds to the area in which the flexible display layer is affixed to the support members (or the digitization layer) in some embodiments. In other embodiments, the entirety of the flexible display layer is affixed to the support members or the digitization layer. In other embodiments, one side of the flexible display layer is affixed to the support member or the digitization layer, while the other side is allowed to move freely over the support members or digitization layer, but is held flat with side bar structures (see below).

As for the distance between the boundary between the fixed and unfixed region, it must account for the circumferential distance around the arc formed by the bent region. Regarding FIG. 6D, it is easy to see that the distance along the flexible electro-optic display must be half of the circumference, or $\pi*R$. Assuming that the boundaries 37 are equidistant from the centerline 39, each "a" must be at least $\frac{1}{2}*(\pi*R-2*R)$, or $a>0.6*R$. In practice it has been found that $a>\pi/2*R$ is preferable, and in many embodiments, it is advantageous to have $a>\pi*R$.

Figure 5D:
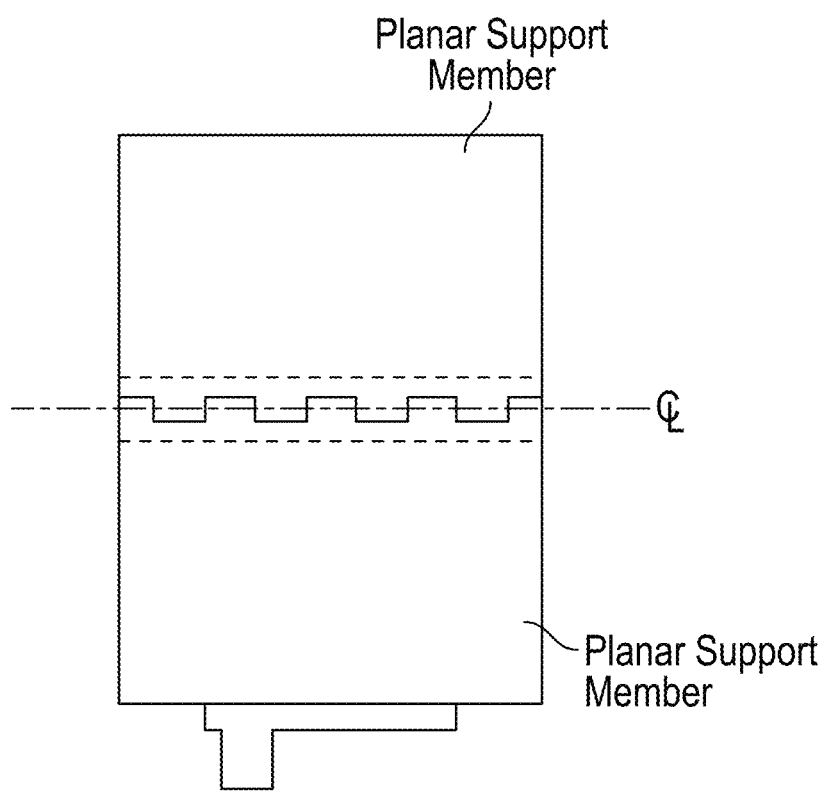
FIG. 5D shows interleaved planar support members in the opened or flattened state.

In order to account for the movement of the unfixed regions of the planar support members toward the centerline from the axes, a spine 32 is included that has an empty volume that exceeds the volume swept by rotation of the unfixed region of the two planar support members about their respective axes. In addition, the spine 32 can be configured to provide extra support for the planar support members when in the closed state. Moreover, a length of the extra support portion only needs to be a half or more of the distance between the axes of rotation but this is not limiting, and the two planar support members can have different lengths. In that case, it is only necessary that a total length of the extra support portion is not smaller than the distance between the axes of rotation. Moreover, as in the planar support member, in the open state, they can be so constituted to be joined alternately in a staggered manner in a region between the two axes as indicated in FIG. 5D.

In general, the flexible display is preferably adhered to planar support members as a whole uniformly. This is the reason why touch feel or visibility of the flexible display can change according to whether or not there is adhesive layer on it because it is thin such as a paper. Although the visibility can be improved, for example, by matting the surface of the flexible display, a user tend to feel the border of an adhesive layer tiered if the flexible display is touched with a finger and so on. Therefore, the fixed portion of the flexible display is preferably adhered to planar support members uniformly.

Figure 6A:
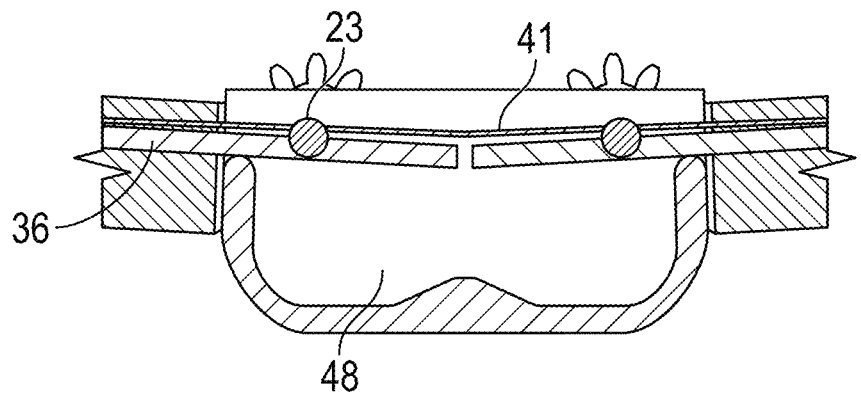
FIG. 6A is an end-on view of an embodiment of an image display apparatus showing the planar support members in a full-open state.
Figure 6B:
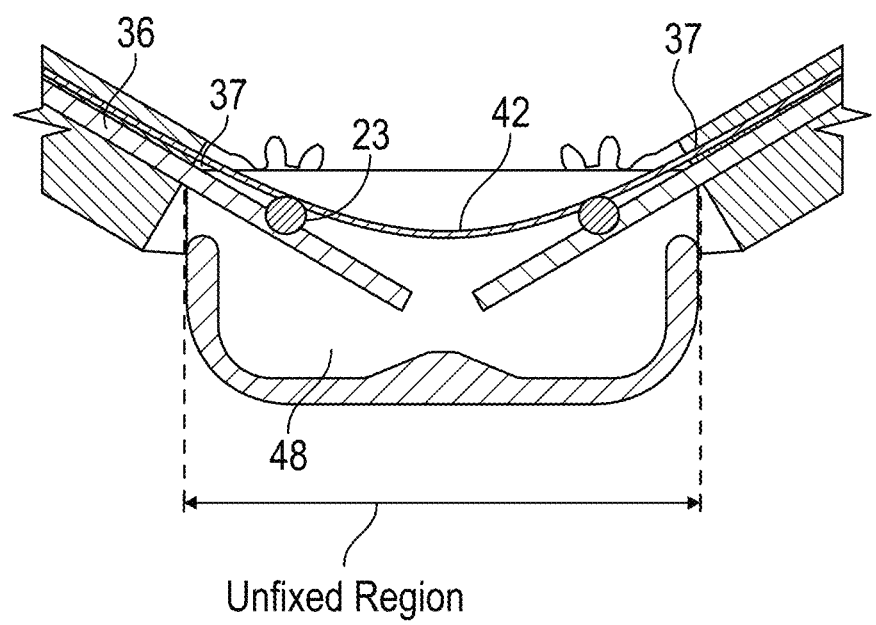
FIG. 6B is an end-on view of an embodiment of an image display apparatus showing the planar support members in a half-open state.
Figure 6C:
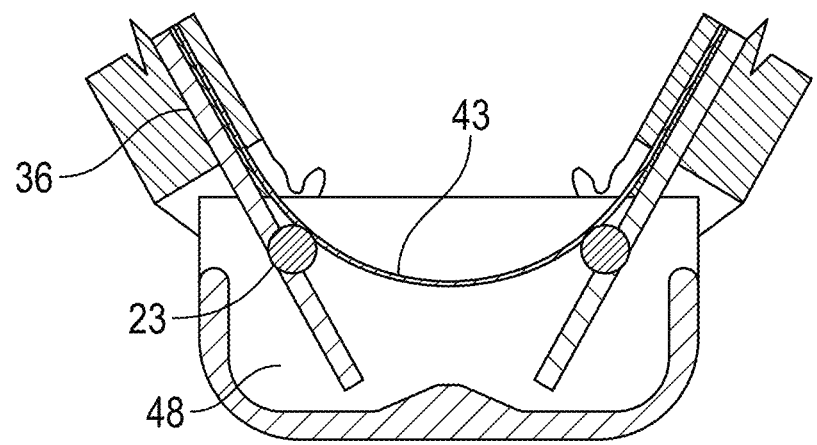
FIG. 6C is an end-on view of an embodiment of an image display apparatus showing the planar support members in an almost closed ("folded") state.
Figure 6D:
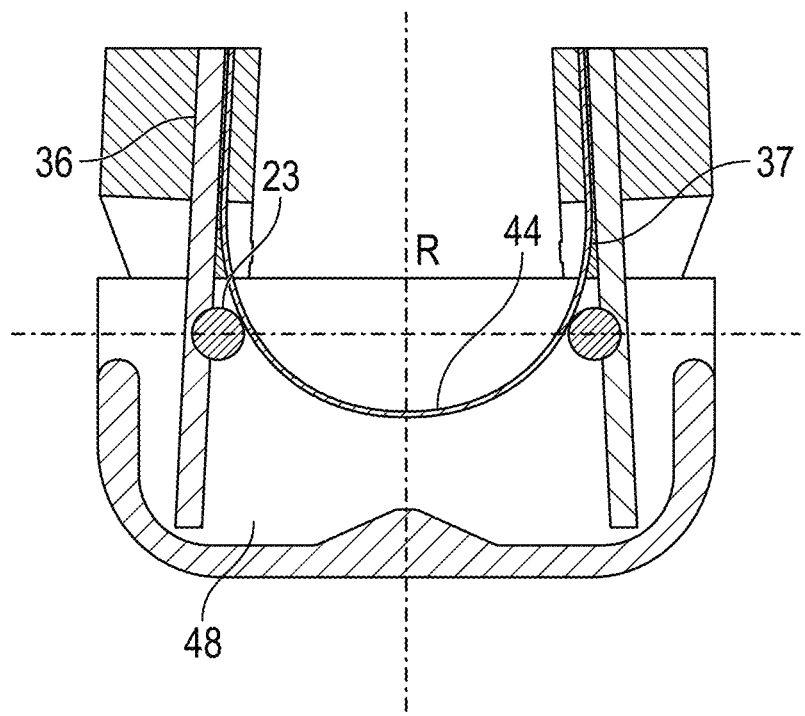
FIG. 6D is an end-on view of an embodiment of an image display apparatus showing the planar support members in a completely closed ("folded") state.

FIGS. 6A to 6D illustrate how unfixed bending portions 41-44 of the flexible electro-optic display change while manipulating the image display apparatus between an open state and a closed state. The unfixed portion 41 indicated in FIG. 6A is flat in any substantially full-open state, however in some embodiments, the angle between planar support members 33 and 36 is approximately 175°. As indicated in FIG. 6B, when planar support members are rotated until the angle between planar support members is 120°, an unfixed portion 42 of the flexible display begins to separate from the unfixed region of the planar support members, thus forming an arc with a large curvature. In FIG. 6C, the linear distance between the boundaries 37 between the fixed and unfixed regions is further shortened. Finally, in FIG. 6D, the linear distance between the boundaries 37 is finally the approximately equal to the distance between the axes of rotation. As discussed above, in folded state, two times of length between the axis and the unfixed line surpluses and the flexible display deflects between the axes of rotation.

Figure 7:
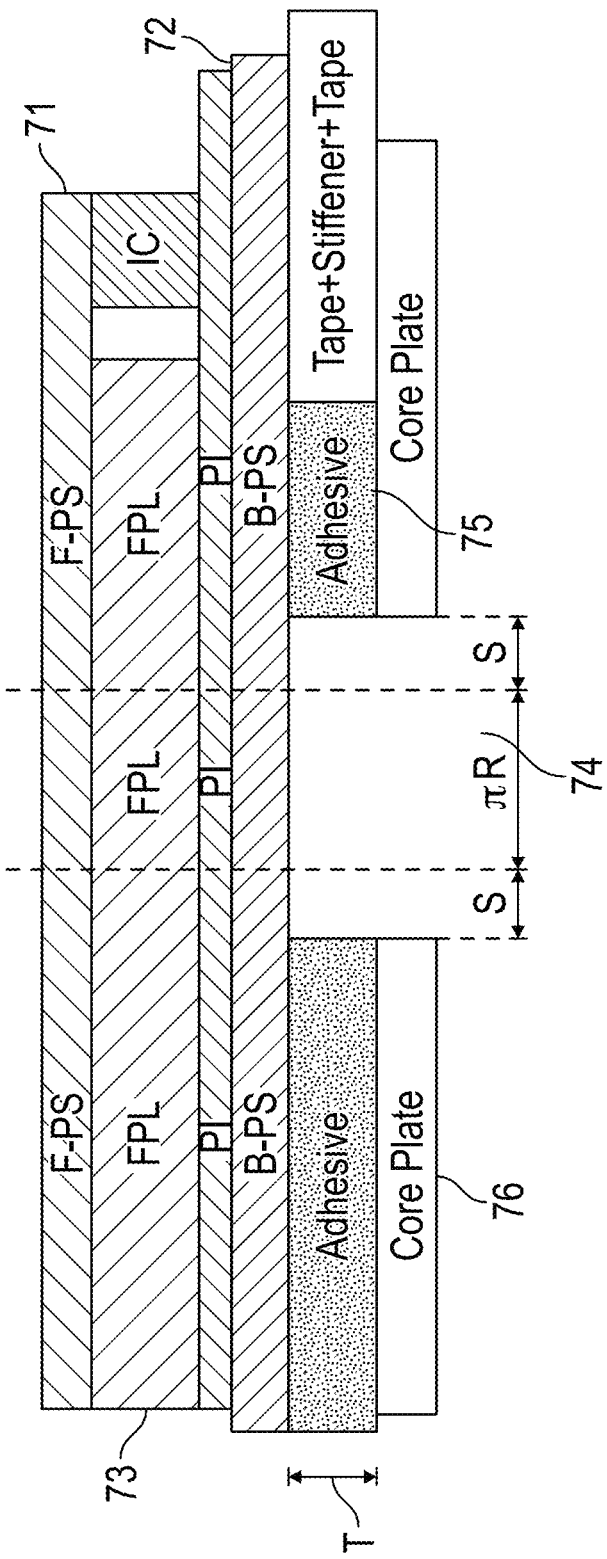
FIG. 7 is a cross sectional view of an embodiment of the invention, showing the different layers of the device, as well as the unfixed area in proximity to the bending region of the flexible display.

FIG. 7 illustrates an embodiment of a foldable display of the invention. As shown in FIG. 7, the flexible display 73 is disposed between a front protective sheet 71 and a back protective sheet 72. The flexible display assembly is also fixed to core plate 76 through adhesive layer 75, but not fixed in the unfixed region 74, near the center of the flexible display, i.e., the portion with the sharpest radius in the folded state. The adhesive layer 75 may be formed by adhesive sheet, film, tape, or optically clear adhesive (OCA). The adhesive layer 75 may have a thickness between 0.05-0.4 mm.

Figure 8B:
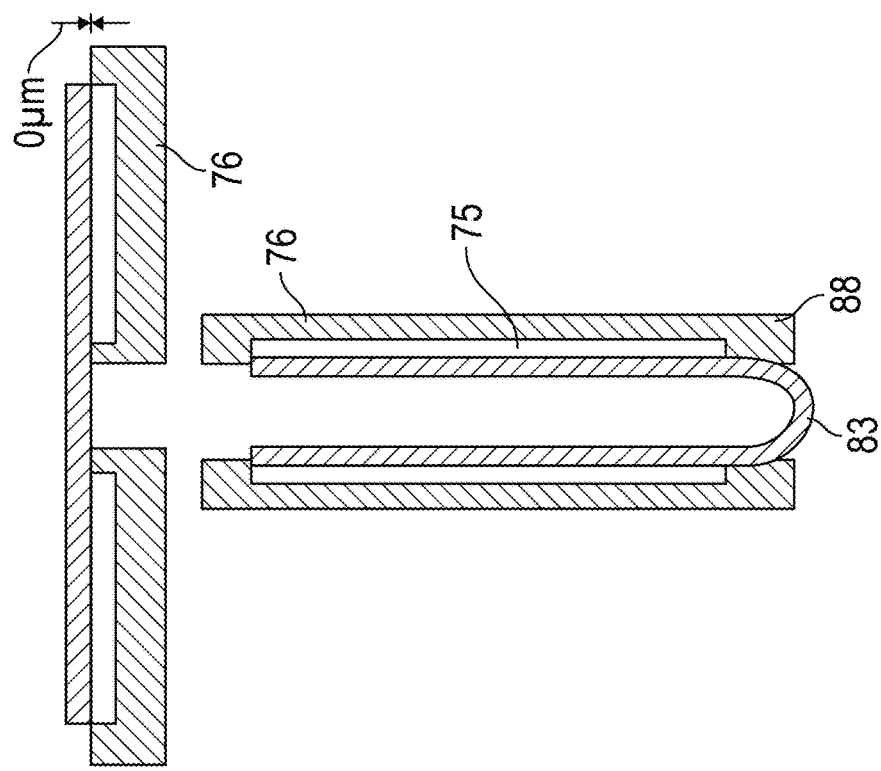
FIG. 8B illustrates an unfixed region with an auxiliary support to reduce the likelihood of backward bending.
Figure 8A:
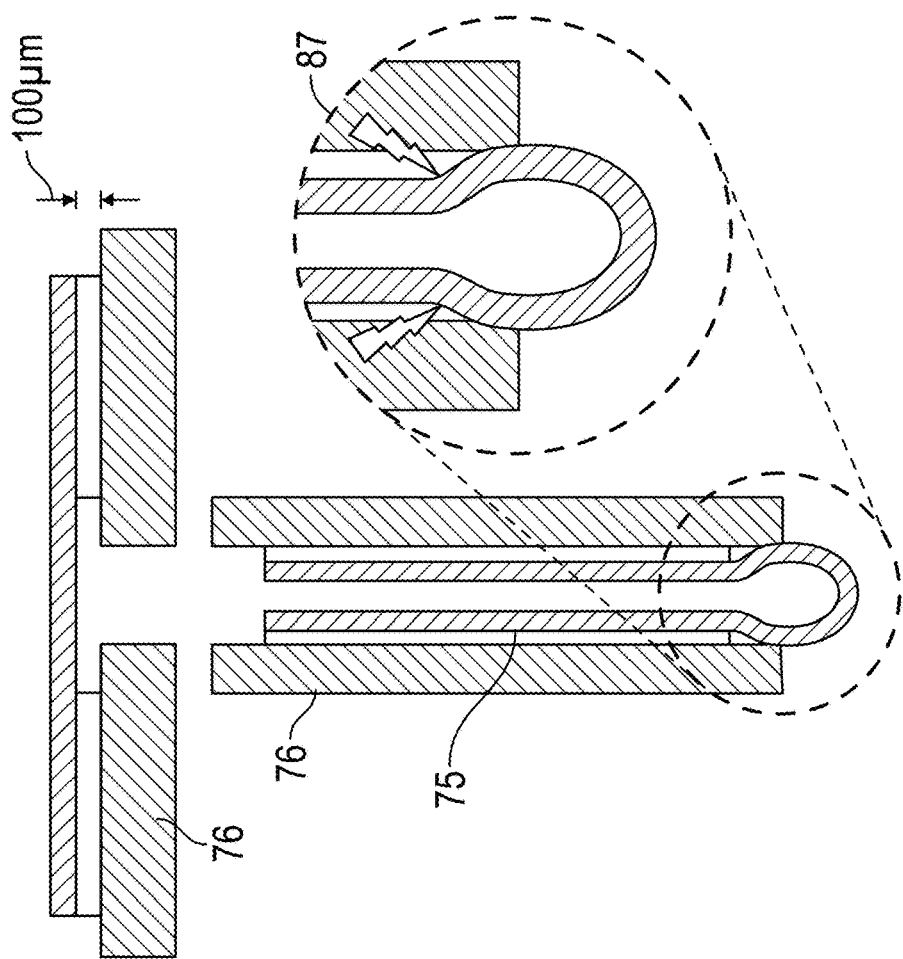
FIG. 8A illustrates undesired backward bending (stretching) of the flexible display.

An exploded view of the bending radius of a foldable display is shown in FIGS. 8A and 8B. FIGS. 8A and 8B have approximately the same unfixed region, however FIG. 8A does not provide an auxiliary support structure 88 to dictate the shape of the bending region 83 when in the folded state. In contrast, FIG. 8B illustrates an embodiment whereby the shape of the bending region 83 is directed by an auxiliary support structure 88. As illustrated in FIG. 8A, because there is no auxiliary support structure on the core plate in the unfixed region, the flexible display has a slight steep slope near boundary 87 between the fixed layer and the unfixed region, which may result in a backwards flex of the flexible display 73, in essence a stretch past "normal" flat operation, which may cause a malfunction of flexible display 73. In the instance of a flexible encapsulated electrophoretic display, this backward bend may result in hemorrhaged capsules which cease to switch, or damage to the flexible thin film transistors (TFTs) or drive lines. Furthermore, after repeated bending (and stretching) of the bending region 83, the bending region is prone to develop wrinkles when in the flat state, which diminishes the reading experience.

Accordingly, an auxiliary support structure 88, which may be simply a thicker portion of adhesive tape, is disposed in the unfixed region as illustrated in FIG. 8B. Because the step of the unfixed region is filled by the film or tape, the slight steep slope near the boundary between the fixed layer and the unfixed region is softened and the appropriate deflection can be obtained through the entire bending region 83. In other embodiments, the auxiliary support structure 88 is formed with contoured molding of the core plate 76 with adhesive layer 75 being essentially flat across the interface between the flexible display 73 and the core plate 76.

Figures 9A, 9B:
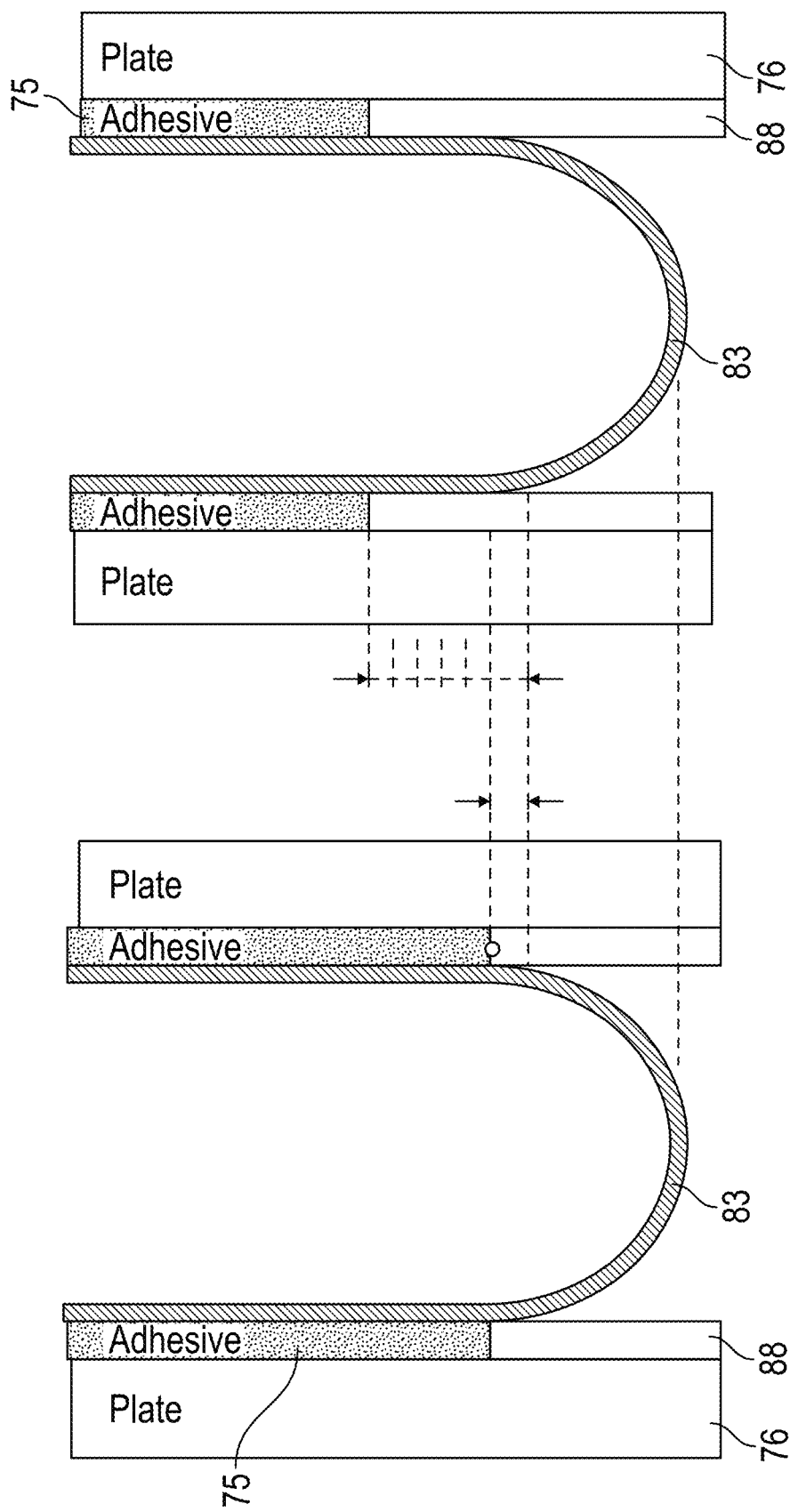
FIG. 9A illustrates an auxiliary support region comprising an extended adhesive region.
FIG. 9B illustrates an auxiliary support region that is a shaped extension of the core plate.

In some embodiments, e.g., as shown in FIG. 9A, the auxiliary support structure 88 is provided by the adhesive layer 75. This is typically preferred when the thickness of adhesive layer 75 is 0.2 mm or smaller. If the adhesive layer 75 is greater than 0.2 mm, the auxiliary support structure 88 typically takes the form of a contoured or extended core plate 76 in the unfixed region, as shown in FIG. 9B. Of course, the form of the auxiliary support structure 88 is not dictated solely by the width of the adhesive layer 75, but can be selected in an appropriate range as long as the steep slope (backward flex; see FIG. 8A) is avoided. Furthermore, other materials could be used as the auxiliary support structure 88, as needed.

While the preferred embodiment has no backward flex, as shown, e.g., in FIG. 8B, the size and shape of the final device may require some backward flex in the flexible display 73 to achieve the desired device thickness when the device is closed. This may be especially true when additional layers, such as a digitizer layer (see below) are added to the device. In the event that a small amount of backward flex will required, it is best to spread the backward flex over a longer linear distance of the flexible display 73, as contrasted in FIGS. 10A and 10B. As shown in FIG. 10A, which is substantially identical to FIG. 8A, where the backward flex is excessive, the flexible display 75 may fail, due to capsule or flexible electronics failures.

FIG. 10B illustrates a design that can overcome this risk when the device design requires some amount of back-flex in the flexible display 73. As shown in FIG. 10, a gradual back-flex 111 is achieved by increasing the width of the unfixed region 74 in order to decrease the slope of the back-flex at the boundary between the adhesive layer 75 and the unfixed region 74.

Figures 11A, 11B:
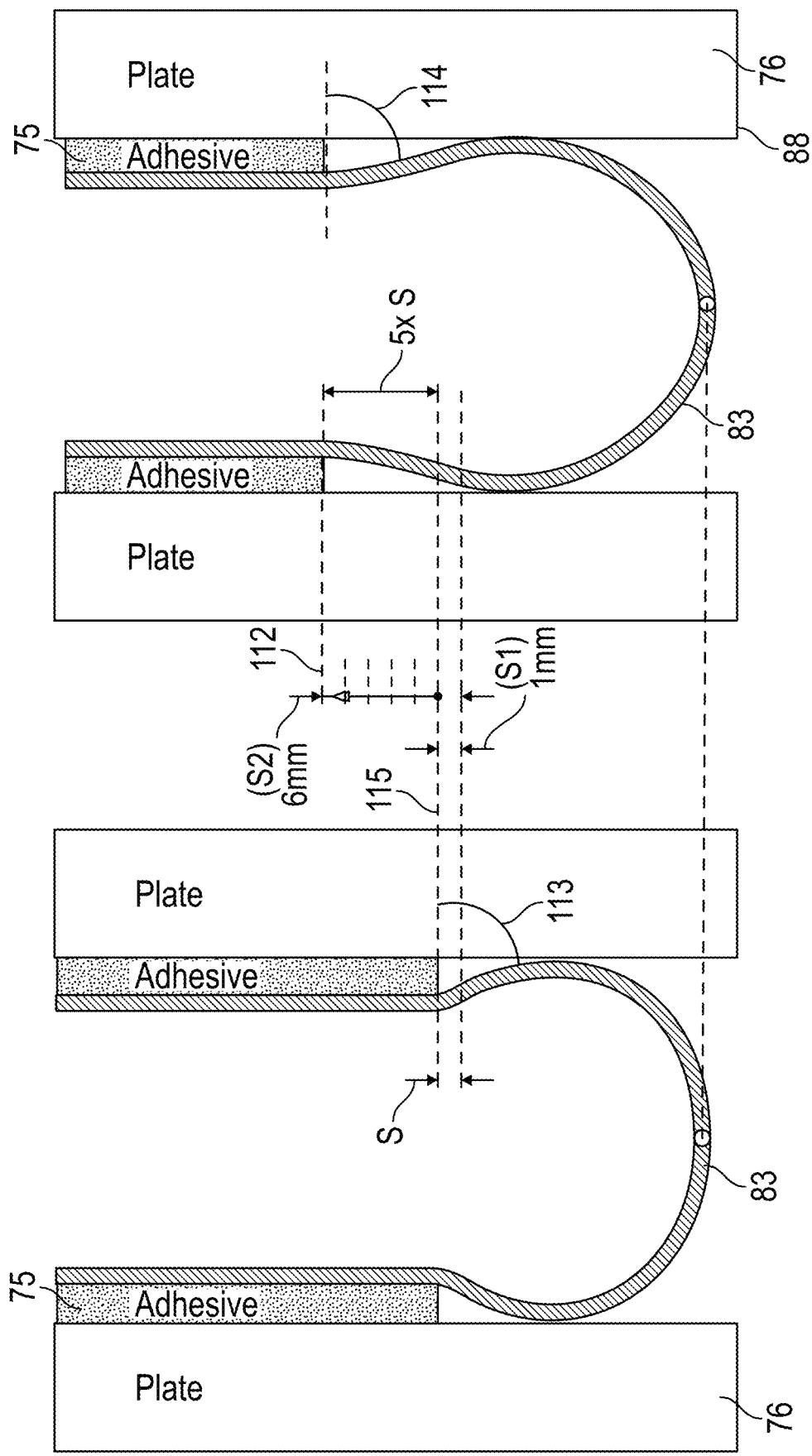
FIG. 11A illustrates an alternative adhesive layer for a device of the invention.
FIG. 11B illustrates an alternative adhesive layer for a device of the invention.

The contrast in inward bending radius between FIGS. 10A and 10B is shown in greater detail in FIGS. 11A and 11B. In FIG. 11A, the unfixed length 115 of unfixed region 74 in the cross-sectional view is short, resulting in a slope angle 113 of the bending region 83 which is smaller than a critical angle, increasing the risk of failure with repeated flexing of the bending region 83. In FIG. 11B, however, the unfixed length 112 is increased, resulting in a slope angle 114 of bending region 83 that is larger than the critical angle. As a result, the flexible display maintains functionality despite repeated bending.

Example

The benefits of the gradual back-flex design of FIG. 11B have been demonstrated. A flexible encapsulated electrophoretic display (E Ink Corporation) was prepared that included a flexible active matrix backplane (Plastic Logic). For this test, the unfixed region 74 was 15 mm wide, while the unfixed length 112 was 6 mm, and thickness of the adhesive layer was 0.1 mm. After more than 5000 flexes from a folded to a flat state, the flexible display maintained full functionality and showed no wrinkles. As a control, a second flexible display device with the dimensions of FIG. 11A was prepared, having an unfixed region 15 mm wide, but with an unfixed length 115 of only 1 mm, and a thickness of the adhesive layer of 0.1 mm. After about 2000 flexes, the control device began to show evidence of failure, including regions of non-switching ink. At 5000 flexes, the difference in image quality between the two devices was evident without additional magnification.

Thus, the invention can provide an image display apparatus that is thin and light-weight and may be folded like a book. The image display apparatus can include a flexible display and a bending mechanism designed to accommodate the folding of the flexible display. In use, the display apparatus can be carried and stored like a regular book. When the book is opened it is very flat and may be rotated 90 degrees to allow the book to be read like a single A4-like sheet of paper.

Writeable Flexible Displays

Figure 12:
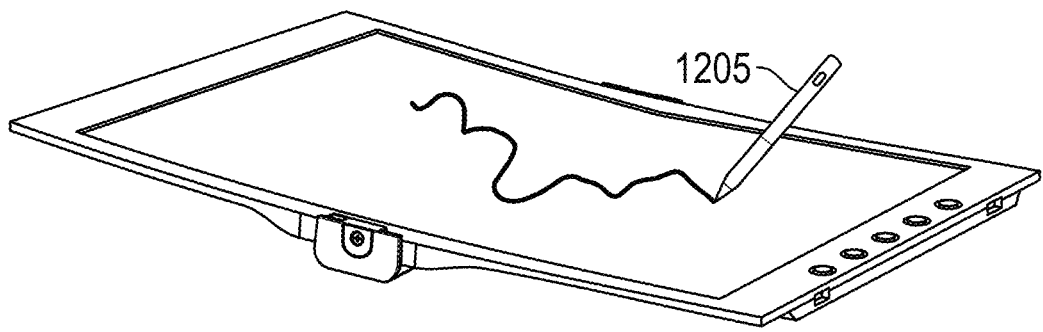
FIG. 12 illustrates a foldable writeable display.

The technology of the invention of the present application can be applied to commercialization as a light-weighted and thin electronic book or an electronic notebook which can be folded in half using the flexible EPD, but by using it as a distance of a smartphone and a tablet product other than the above and by allowing it to be linked with those products via Bluetooth or the like, a product as a second display utilizing the power-saving feature that the flexible EPD originally has can be developed. Advanced embodiments may also include the ability to "write" electronically directly in the book, as shown in FIG. 7. As shown in FIG. 12, a stylus 1205 can be used to interact with the flexible electro-optic display. The stylus can interact with the display using electric fields, electromagnetic fields (e.g., light), capacitance, physical touch, optical sensing, or magnetic field. The electro-optic display may include a digitization layer to allow the input to be tracked and recorded, or the stylus may interact directly with the flexible electro-optic display to change the state of the display.

A number of different digitizing systems can be used with the flexible writeable display designs that are shown here. For example, Electro Magnetic Resonance (EMR) digitizing technology of Wacom (Wacom Co. Ltd., Kazo, Japan) whereby the stylus tip (including an inductive loop) is located by an energized digitizing layer located behind the flexible display. Other technologies, such as capacitive touch with an active stylus (N-Trig Technologies), or active electrostatic sensing (Wacom) may be used with the invention.

Figure 13:
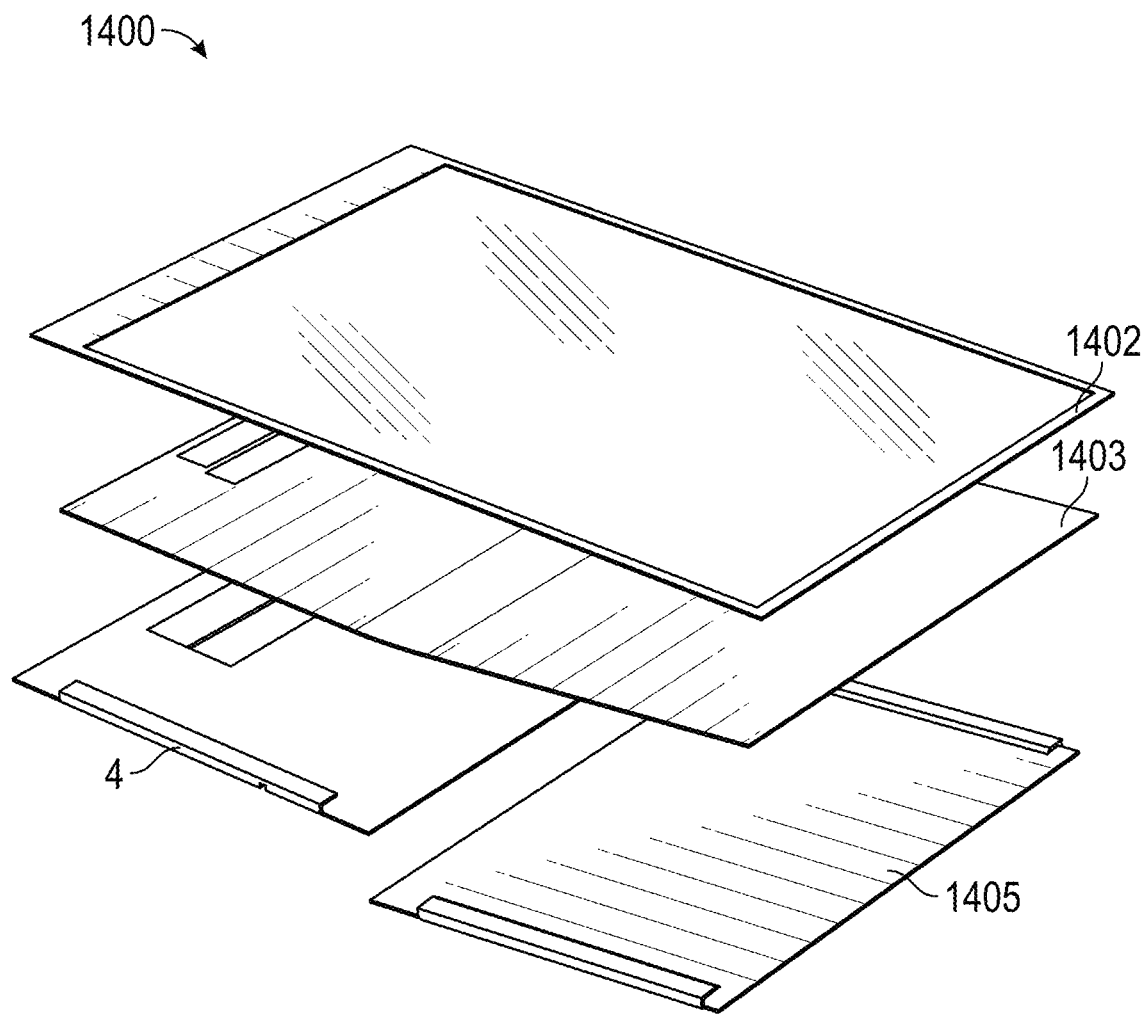
FIG. 13 is an exploded view of a foldable writeable display.

FIG. 13 is an exploded view of a flexible writeable device 1400 including a flexible electrophoretic display (EPD) layer 1402, a jointed digitization layer (EMR) 1403, and core plates 1405. As illustrated in FIG. 13, the flexible writeable device 1400 has a thickness of approximately 1 cm, and has the feeling of a thin book. When in a folded state, the information terminal can be stably carried like an ordinary book, and when fully open, it has a substantially flat shape as illustrated. However, unlike an ordinary book, the content is updateable electronically, and when combined with a stylus (not shown), a user can take notes and mark-up documents. A user can also use the flexible writeable device 1400 as a notepad or a sketch pad.

Figure 14:
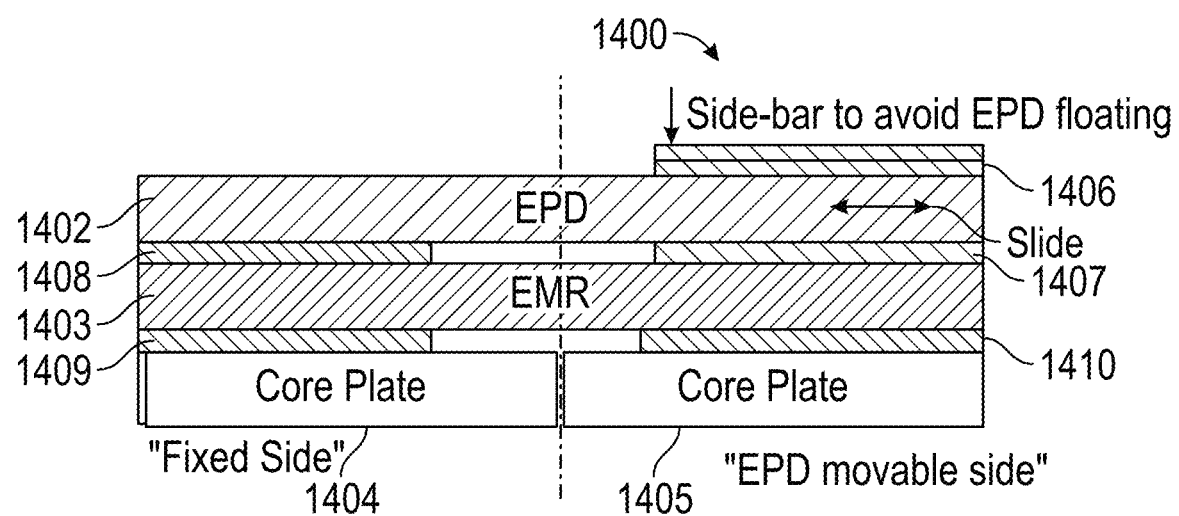
FIG. 14 is a cross-sectional view of a foldable writeable display that incorporates a flexible display layer that is not affixed to a digitization layer beneath it.

FIG. 14 is a cross-sectional view illustrating the layers of an embodiment of a flexible writeable device 1400. The visible content is displayed via a flexible EPD layer 1402, which includes both an electrophoretic medium and a flexible active matrix backplane. A digitization layer 1403 is disposed between the flexible EPD layer 1402 and the core plate 1404 (or 1405), which provides structural stability and protects the flexible EPD layer 1402 and the digitization layer 1403 from physical shock. The digitization layer 1403 is configured to detect the motion of a stylus, and may work through electromagnetic sensing, capacitive sensing, or light sensing. The stack additionally includes adhesive layers to maintain the configuration of the layers.

As illustrated in FIG. 14, portions of the flexible writeable device 1400 can be configured to move relative to each other when the flexible writeable device 1400 is folded. In one embodiment, (shown on left side of FIG. 14, "Fixed side") the flexible EPD layer 1402 is fixed relative to the digitization layer 1403 by first adhesive layer 1408, while the digitization layer 1403 is fixed to the core plate 1404 via second adhesive layer 1409. In another embodiment, (shown on right side of FIG. 14, "EPD moveable side") the flexible EPD layer 1402 is configured to move relative to the digitization layer 1403. Typically, the flexible EPD layer 1402 is not allowed to completely float, but is confined by structures 1406 and 1407, which provide a track for the flexible EPD layer 1402 to slide laterally when the device is folded. (See below.) However, the digitization layer 1403 is typically fixed to the core plate 1404 via and adhesive layer 1410 even when the flexible EPD layer 1402 is not fixed. Both the fixed an unfixed configurations retain an unfixed region proximal to the folding axis, to provide for controlled bending, as described above.

A flexible writeable device 1400, as shown in FIG. 14 may include additional protective layers, encapsulating layers, or tactile layers to make the flexible writeable device 1400 more robust and to improve the writing experience with the stylus.

Figure 15A:
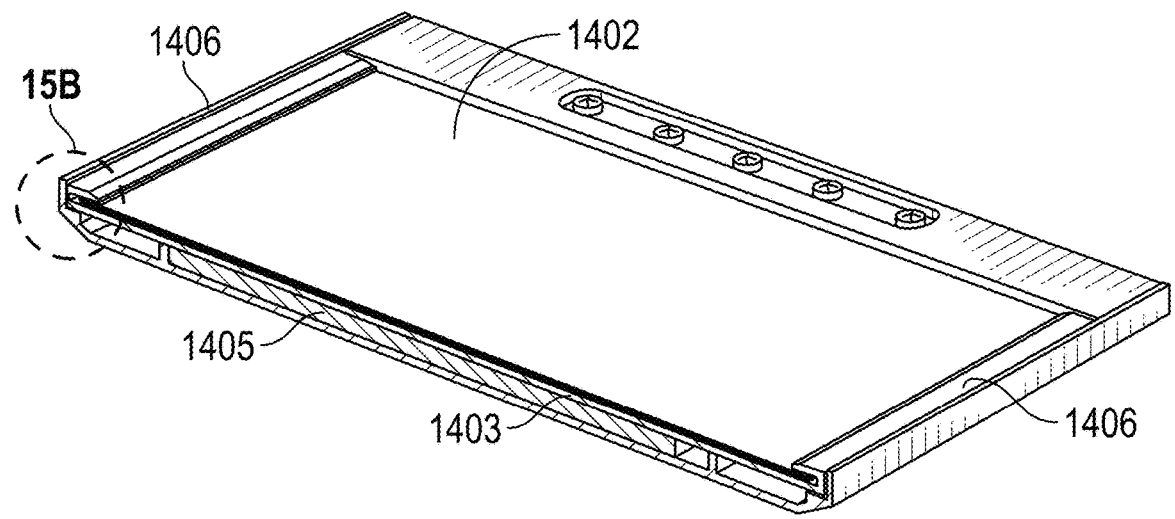
FIG. 15A is a cut-away view, showing the layers of foldable, writeable display.
Figure 15B:
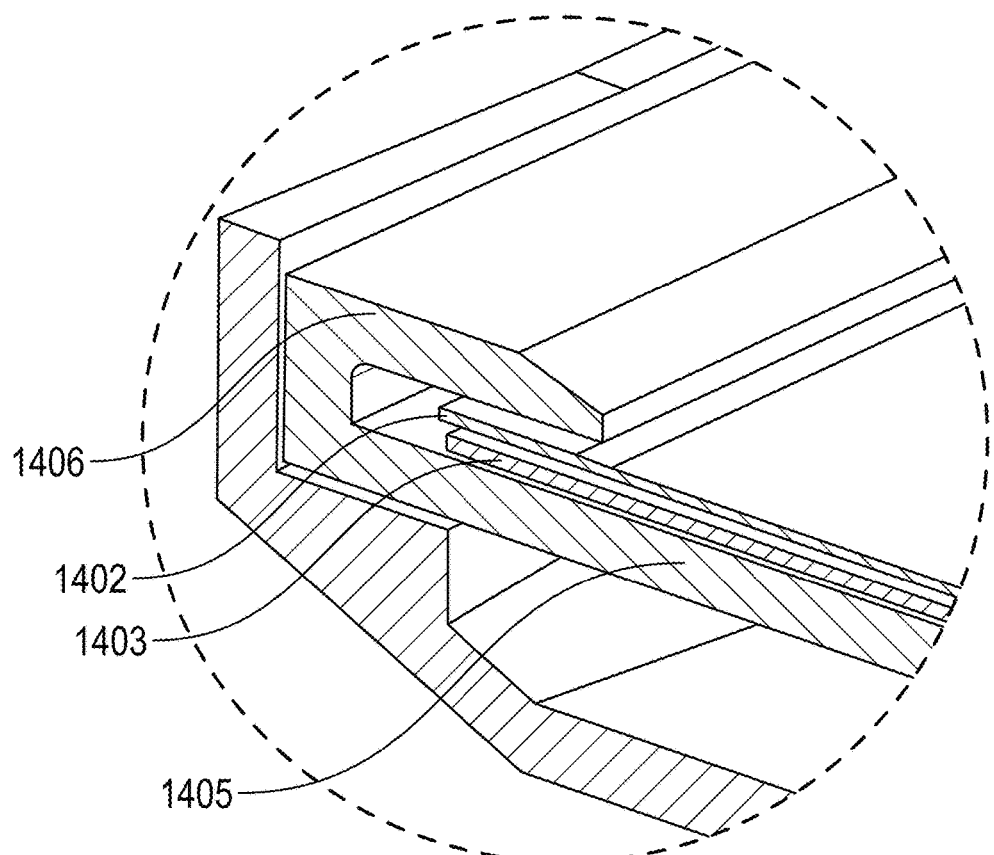
FIG. 15B is an exploded view of the corner of FIG. 15A, showing detail of the flexible display layer and the side bar structures that keep the flexible display layer flush against the digitization layer while allowing them to move with respect to each other as the device is moved between an open and closed state.

In the "EPD moveable side" embodiment, additional structures are typically provided to maintain good flatness when the device is in the open state. As shown in FIGS. 15A and 15B, a side bar structure 1406 retains the flexible EPD display 1402 from the top, and keeps the edges of the flexible EPD display 1402 flat against the digitizing layer 1403 and, ultimately, the core plate 1405 flat when the device is bent. This can be seen well in the enlarged view of the corner of the device in FIG. 15B. As a result, because the flexible EPD display 1402 can deflect more when the flexible writeable device 1400 is closed, high flatness of the flexible display can be maintained in the open when the digitizing layer 1403 is present, which can be substantially thicker than the flexible EPD display 1402. Optionally, another lubricating layer 1407, which may be, for example, a thin sheet of dielectric, to facilitate the flexible EPD layer 1402 and the digitizing layer 1403 sliding across each other.

Figure 16:
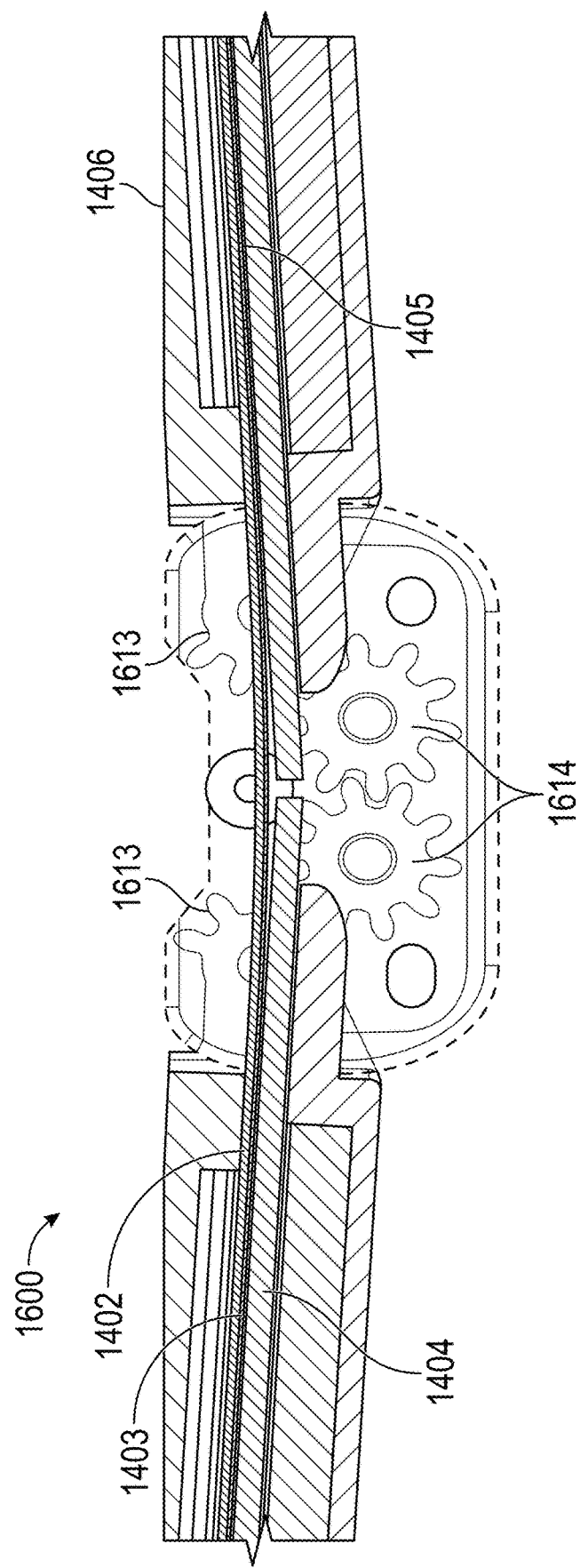
FIG. 16 details synchronization gears that coordinate smooth opening and closing of core plates supporting the digitization layer and the flexible display layer.

FIG. 16 is a cross-sectional view illustrating a hinge portion of flexible writeable device 1600 which includes a first side (left in FIG. 16) whereby the flexible EPD display 1402 is fixed to the digitization layer 1403, and a second side (right in FIG. 16) whereby the flexible EPD display 1402 can move with respect to the digitization layer 140 when the flexible writing device is closed. As seen on the right side of FIG. 16, the flexible EPD display 1402 is sandwiched between the side bar structure 1406 and the digitization layer 1403 and core plate 1405. Thus, the flexible writeable device can open and close without pinching or buckling the flexible EPD display 1402. In particular, synchronizing gears 1614 coordinate the rotation of axis gears 1613 so that the core plates 1404 and 1405 open and close smoothly. Additionally, because both core plates 1404 and 1405 open and close at the same angle, for example, flexible writeable device can be moved between an open and a closed state with one hand.

Figure 17:
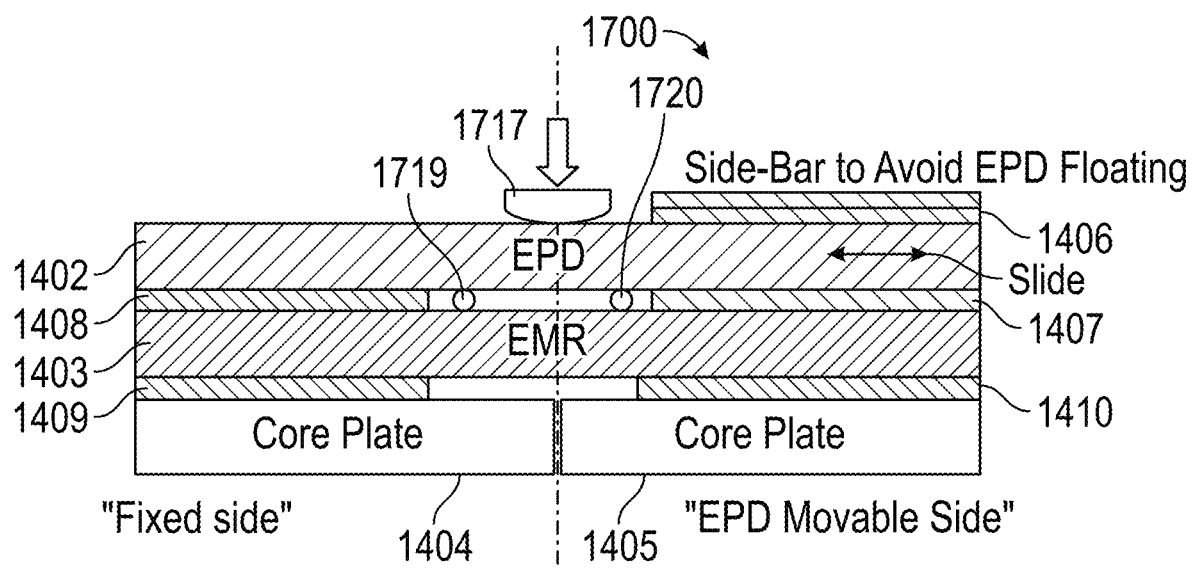
FIG. 17 shows a cross section of layers of a foldable, writeable display, including a pressing mechanism to assist folding.

In some embodiments, the closing and bending can be facilitated with the inclusion of a pressing mechanism 1717 that applies downward pressure to the flexible EPD display 1402 at the bending portion, e.g., the unfixed region, when the flexible writable device 1400 is closed. As illustrated in FIG. 17, pressing mechanism 1717 is disposed against the flexible EPD display 1402 and moves in conjunction with the synchronizing and axis gears (1614 and 1613—See FIG. 16) to cause the combined layers to rotate around axes 1719 and 1720 as depicted in FIG. 17 by the curved arrows. Simultaneously with the rotation, the right side of the flexible EPD display 1402 slides along the digitizing layer 1403, allowing the flexible EPD display to fold without pinching.

Figure 18:
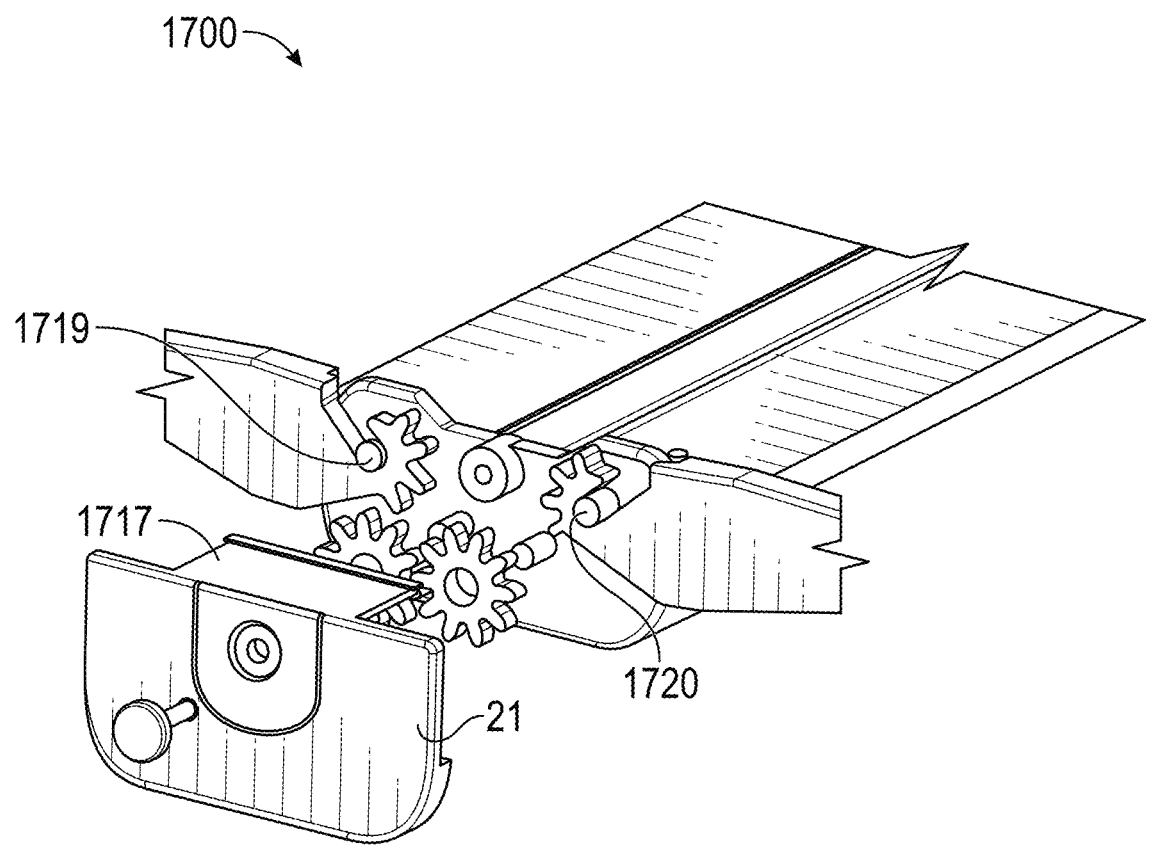
FIG. 18 is an end view of a foldable, writeable display, including a pressing mechanism.

FIG. 18 shows an end view of the completed flexible writeable device 1700, including the pressing mechanism 1717, in a perspective similar to FIGS. 4A and 4B, described above. The pressing mechanism 1717 can be integrated into the spine cover 21. (The length of the pressing mechanism 1717 has been abbreviated so that the underlying structures can be viewed.) Accordingly, the flexible EPD display 1402 is naturally pressed down from above by the pressing mechanism 1717 when the flexible writeable device 1700 is closed.

Touch-Sensing Display

A touch sensor can be integrated into a foldable writeable display, to produce a foldable, writeable, device with touch sensing 2000. For the most part, the touch sensor does not increase the bulk of the device, but rather leaves the foldable, writeable, device with touch sensing 2000 looking substantially similar to the foldable device shown in FIGS. 3A and 3B.

Figure 19:
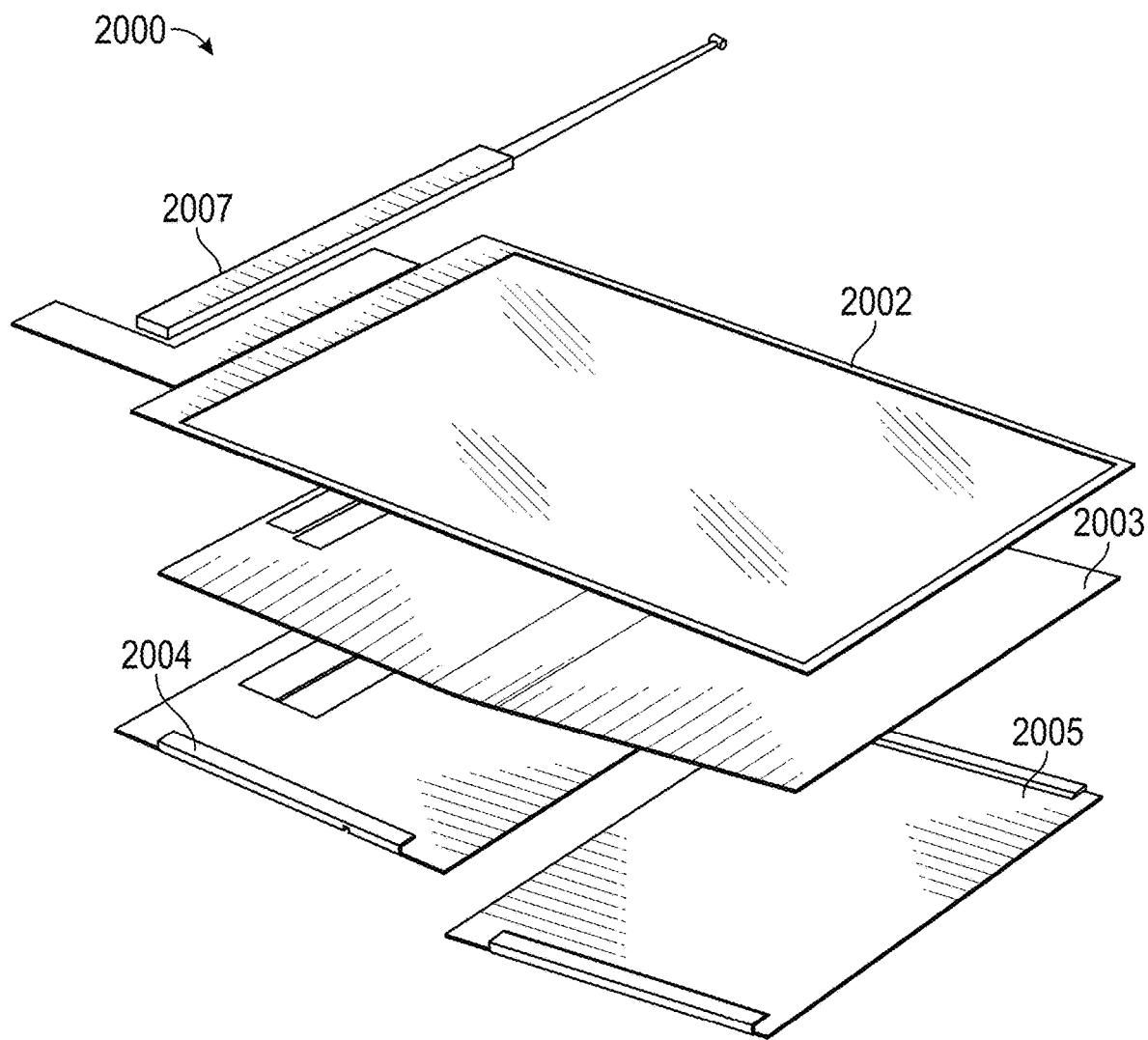
FIG. 19 is an exploded view of a foldable, writeable display including touch sensing.
Figure 20:
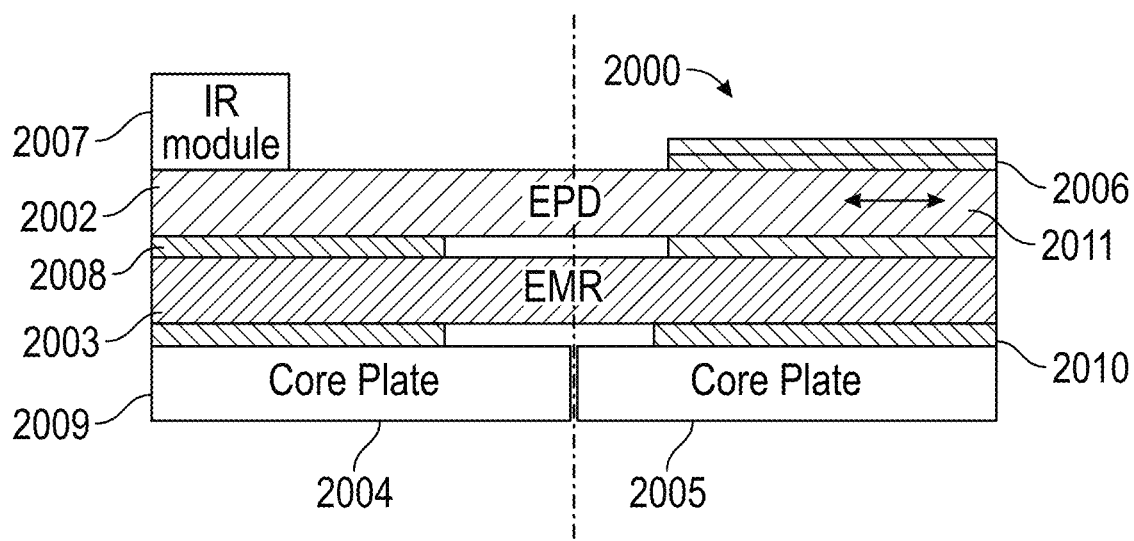
FIG. 20 is a cross section of a foldable, writeable display including touch sensing, showing the integration of a touch sensor unit.

An exploded view of the foldable, writeable, device with touch sensing 2000 is shown in FIG. 19. The device 2000 includes a sensor layer 2003, disposed under flexible display layer 2002, for detecting the position of a stylus or other marking device. Both the sensor layer 2003 and the flexible display layer 2002 are supported by core plates 2004 and 2005, as described above with respect to FIGS. 13-16. This construction is shown in greater detail in FIG. 20, which shows a cross-sectional view of the full structure. Again, as discussed above with respect to FIG. 14, one end of the flexible display layer 2002 can be unfixed, so that it is able to slide past the sensor layer 2003 as the device is moved from an open (flat) state to a closed state. However, as shown in FIG. 20, the unfixed portion of the flexible display layer (i.e., right side of FIG. 20) is typically not on the side of the device 2000 to which the touch sensor unit 2007 is not affixed (i.e., left side of FIG. 20).

Figure 21:
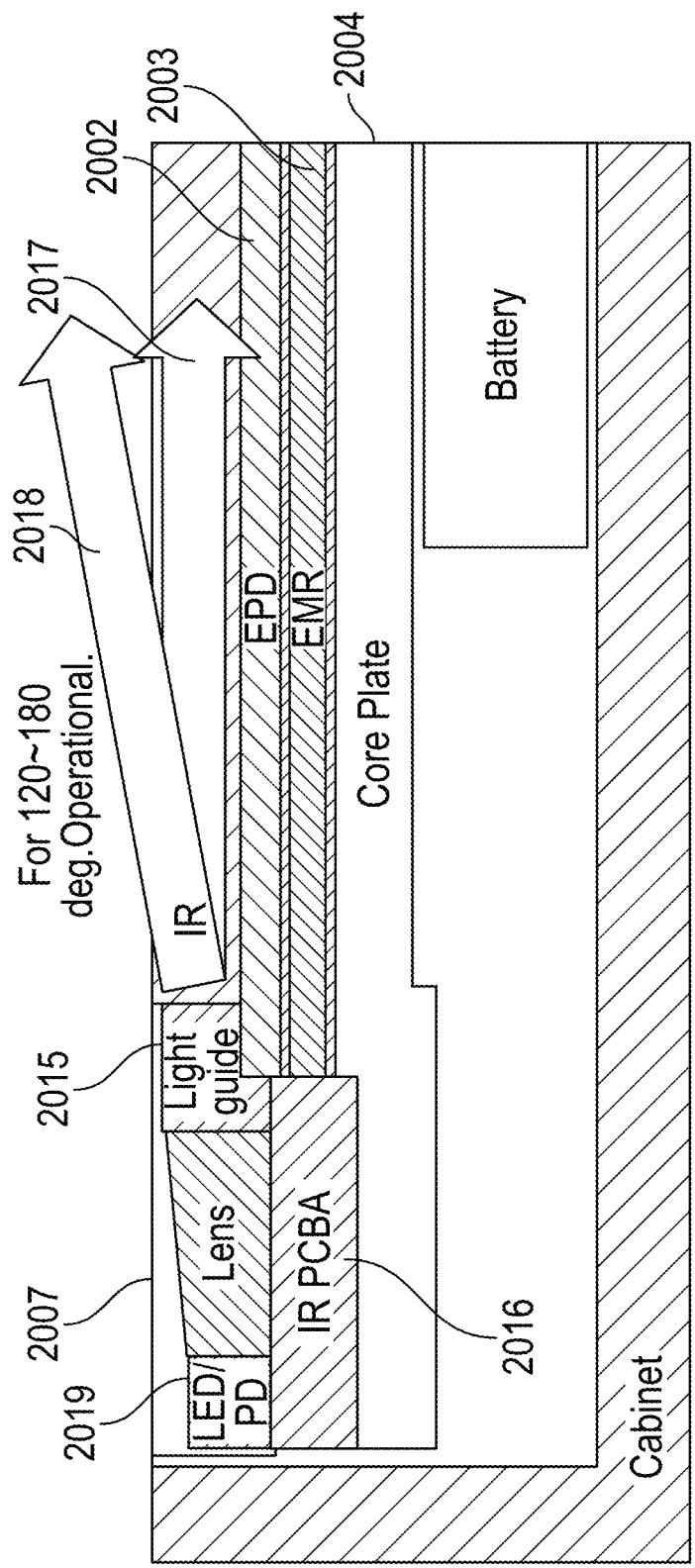
FIG. 21 illustrates operation of a touch sensor that uses infrared light to sense the location of a touch.

Touch sensor unit 2007 emits light in a direction substantially parallel to the surface of flexible display layer 2002, as shown in FIG. 21. When an operator moves his or her finger in the desired direction on the surface of flexible display layer 2002, the touch sensor unit 2007 detects that the finger crosses the emitted light and then identifies the position of the finger. The touch sensor unit 2007 emits light, for example infrared light over the surface of flexible display layer 2002, and detects the light reflected from an object to be detected such as a finger and identifies the position of the object to be detected. As shown in FIG. 21, light emission unit 2019 emits the light 2017 through a light guide 2015 in a direction substantially parallel to the surface of the flexible display layer 2002. The reflected light from the object to be detected (e.g., a finger) is received by a light detector 2016, which is collected through light guide 2015. The light emission unit 2019 may be a standard IR light emitting diode, such as available from Luminus (Sunnyvale, Calif.). The detector may be an IR photodiode (or an array thereof) as available from Everlight Electronics (Carrollton, Tex.). In some embodiments, the light emission unit 2019, light detector 2016, and light guide 2015 are integrated into a single system, such as available from Leyard (Hillsboro, Oreg.).

In most instances, the light 2017 is emitted substantially parallel to the surface of the flexible display layer 2002, i.e., the preferred configuration when the device 2000 is in a completely flat state. However, the device 2000 need not be completely flat for the touch sensor unit 2007 to operate effectively. As shown in FIG. 22A, the touch sensor unit easily works when the core plates 2004 and 2005 are not completely planar, e.g., if they make a slight angle, e.g., 174° or greater. Furthermore, because the light 2017 is emitted at a small height (h) above the flexible display layer 2002, and because the lens of the light emission unit 2019 results in an angular (θ) emission (as opposed to collimated) a simple light emission unit 2019 can cover the entire area of the surface of flexible display layer 2002 for many slight bend angles, as shown in FIG. 22B. In some embodiments, the device 2000 has functional touch sensing when the core plates 2004 and 2005 define an angle of less than 180°, for example, between 180° and 145°, e.g., between 180° and 150°, e.g., between 180° and 165°.

It is possible to calculate the angle of emission below which the device will cease to have IR sensing over the entire plane of the flexible display layer 2002. See FIG. 22B. In the case that the opening angle is 174°, H-h is approximately $2 \times l \times \theta \times (\eta/180)$ and H is approximately $l \times 6 \times (\eta/180)$. Accordingly, θ is approximately $3 - 90 \times h/(l \times \pi)$. In order to cover whole area of the flexible display, the angle between the direction of the light emitted by touch sensor unit 7 and the direction parallel to the surface of flexible display 2 is preferably more than θ. For example, if h is 5 mm and l is 100 mm, θ is approximately 1.56. Accordingly, the angle between the light direction and the direction parallel to the surface is preferably more than 1.56°. More preferably, the angle is more than 2°.

This is not to say that touch functionality must be limited to when the core plates 2004 and 2005 are substantially co-planar. In some embodiments, as illustrated in FIG. 23, the directionality of the light emission unit 2019 may altered with the bending angle of the device 2000. This may be done with, e.g., an angle linking mechanism 2026 that includes synchronizing gears that rotate the touch sensor unit as the device 2000 is opened and closed.

Another embodiment, illustrated in FIG. 24, incorporates two different touch sensor units 2007A and 2007B, each with a different type of light source. This embodiment also includes filters 2501 and 2502 to make sure that only light from the desired touch sensor unit is received at that particular touch sensor. Accordingly, the touch sensor unit 2007A or 2007B will detect only touches on that side when the device is in a partially open state. When the device is fully open, both sensors will operate over the same space, however any double sensing this can be accommodated for by comparing the detected position of the two touch sensor units or simply taking the average of the two measured positions.

Since the portable information apparatus of the present application includes a touch sensor unit at only one side of the body, a light-weighted and thin terminal and a spread type touch panel can achieved. Therefore, the problems that bending breakage of the touch panel occurs and that when using the portable information apparatus with the certain angle between plates, the touch panel can detect a touch in error at the bending portion under the pressure can be solved. The technology of the invention of the present application results in a foldable, writeable, touch sensitive device, which may be integrated into an ecosystem of devices, including WIFI, Bluetooth, or the like.

Definitions

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" or "gray scale" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An image display apparatus comprising:
   a flexible electro-optic display including two planar portions and a bendable portion, the bendable portion being flexible and capable of displaying an image;
   two planar support members, each planar support member being substantially rectangular and comprising a fixed region and an unfixed region, wherein the fixed region is coupled to and supports one of the planar portions of the flexible electro-optic display, and wherein the unfixed region is not coupled to the flexible electro-optic display; and
   a bending mechanism comprising two separate axes of rotation that are parallel to a center line defined by the flexible electro-optic display, wherein each of the two axes are set apart from the center line by a predetermined distance, and wherein each of the axes defines a pivot of a planar support member,
   wherein each pivot is in proximity to a boundary between the fixed region and the unfixed region of the planar support member, and
   wherein "ζ" is a distance between the axes, "R" is a minimum radius of curvature threshold for operation of the bendable portion of the flexible electro-optic display, and "ζ" and "R" are related as ζ>2*R.

2. The image display apparatus of claim 1, wherein a portion of the flexible electro-optic display is bonded to the planar support member in the fixed region.

3. The image display apparatus of claim 1, wherein a portion of the flexible electro-optic display is configured to slide freely against a support member.

4. The image display apparatus of claim 1, wherein the flexible electro-optic display comprises an electrophoretic medium.

5. The image display apparatus of claim 4, wherein the electrophoretic medium is encapsulated.

6. The image display apparatus of claim 4, wherein the electrophoretic medium is distributed in a plurality of microcells.

7. The image display apparatus of claim 1, wherein each of the two separate axes of rotation includes a rotation gear coupled to an end of each axis, and the bending mechanism further comprises a rotation synchronizer for synchronizing rotation of the rotation gears.

8. The image display apparatus of claim 7, wherein the rotation synchronizer comprises two separate synchronizing gears, wherein each of the synchronizing gears is engaged with the other synchronization gear and one of the rotation gears coupled to an axis.

9. The image display apparatus of claim 1, wherein the bending mechanism further comprises an empty volume exceeding the volume swept by rotation of the unfixed region of the two planar support members about their respective axes.

10. The image display apparatus of claim 1, further comprising an auxiliary support structure configured to prevent backward flexing of the bendable region.

11. The image display apparatus of claim 1, wherein the flexible electro-optic display comprises a flexible backplane including an array of pixels.

12. The image display apparatus of claim 11, wherein the flexible backplane includes at least 100 pixels for each 2.5 cm of linear distance across the backplane.

13. The image display apparatus of claim 1, further comprising a digitization layer that allows the position of a stylus to be tracked, and "writing" to be achieved on the device.

14. The image display apparatus of claim 1, further comprising a touch sensor configured to detect the presence of an object touching the display apparatus.

15. The image display apparatus of claim 14, wherein the touch sensor is configured to correlate a touch to a different location on the image display apparatus depending upon the angular displacement of the two planar portions with respect to each other.

16. The image display apparatus of claim 14, wherein the touch sensor includes two separate detectors, and each separate detector senses a different wavelength of light.

17. An image display apparatus comprising:
a flexible electro-optic display including two planar portions and a bendable portion, the bendable portion being flexible and capable of displaying an image;
two planar support members, each planar support member being substantially rectangular and comprising a fixed region and an unfixed region, wherein the fixed region is coupled to and supports one of the planar portions of the flexible electro-optic display, and wherein the unfixed region is not coupled to the flexible electro-optic display; and
a bending mechanism comprising two separate axes of rotation that are parallel to a center line defined by the flexible electro-optic display, wherein each of the two axes are set apart from the center line by a predetermined distance, and wherein each of the axes defines a pivot of a planar support member,
wherein each pivot is in proximity to a boundary between the fixed region and the unfixed region of the planar support member, and
wherein "ζ" is a distance between the axes, "a" is a distance from an axis to the nearest edge of a fixed region, "R" is a minimum radius of curvature threshold for operation of the flexible electro-optic display, and "ζ," "a," and "R" are related by $2a+\zeta > \pi*R$.

18. The image display apparatus of claim 17, wherein $2*a > \zeta$.

19. The image display apparatus of claim 17, wherein a portion of the flexible electro-optic display is bonded to the planar support member in the fixed region.

20. The image display apparatus of claim 17, wherein a portion of the flexible electro-optic display is configured to slide freely against a support member.

21. The image display apparatus of claim 17, further comprising an auxiliary support structure configured to prevent backward flexing of the bendable region.

* * * * *